United States Patent
Phillips et al.

(10) Patent No.: US 10,909,493 B1
(45) Date of Patent: Feb. 2, 2021

(54) ORCHESTRATION LAYER ARRANGEMENTS FOR DETERMINING A DELIVERY OPTION AND ORCHESTRATING DELIVERY

(71) Applicant: Capital One Services, LLC, McLean, VA (US)

(72) Inventors: Jeremy Phillips, Brooklyn, NY (US); Shevata Tula, Edison, NJ (US)

(73) Assignee: Capital One Services, LLC, McLean, VA (US)

( * ) Notice: Subject to any disclaimer, the term of this patent is extended or adjusted under 35 U.S.C. 154(b) by 48 days.

(21) Appl. No.: 16/525,789

(22) Filed: Jul. 30, 2019

(51) Int. Cl.
*G06Q 10/08* (2012.01)
*G06Q 40/02* (2012.01)

(52) U.S. Cl.
CPC ..... *G06Q 10/0833* (2013.01); *G06Q 10/0838* (2013.01); *G06Q 10/08355* (2013.01); *G06Q 10/083* (2013.01); *G06Q 40/02* (2013.01)

(58) Field of Classification Search
CPC .. G06Q 10/083; G06Q 10/0835; G06Q 10/08; G06Q 40/02; G06Q 10/0832; G06Q 20/24; G06Q 20/354
USPC .................................. 705/330, 334–335, 35
See application file for complete search history.

(56) References Cited

U.S. PATENT DOCUMENTS

| | | | | |
|---|---|---|---|---|
| 2003/0229548 A1* | 12/2003 | Kakuta | ................ | G06Q 20/341 705/26.1 |
| 2004/0230601 A1* | 11/2004 | Joao | ....................... | G06Q 10/08 |
| 2007/0239602 A1* | 10/2007 | Goodman | ............... | G06Q 20/10 705/41 |
| 2012/0047075 A1* | 2/2012 | Balistierri | ............... | G06Q 40/00 705/71 |
| 2015/0278759 A1* | 10/2015 | Harris | ............... | G06O 10/08355 705/338 |
| 2016/0285997 A1* | 9/2016 | Wu | ......................... | H04L 67/42 |
| 2017/0024804 A1* | 1/2017 | Tepfenhart, Jr. | ... | G06Q 30/0635 |

(Continued)

OTHER PUBLICATIONS

Wade, Betsy; "Lire and Francs Via the Web"; New York Times; Late Edition (East Coast); Aug. 27, 2000; p. 5,4 (Year: 2000).*

(Continued)

*Primary Examiner* — Michael P Harrington
*Assistant Examiner* — Brian A Tallman
(74) *Attorney, Agent, or Firm* — Kacvinsky Daisak Bluni PLLC

(57) ABSTRACT

Delivery orchestration arrangements to: access a financial institutional database including customer, rules and security requirements data, to determine customer eligibility for delivery of a product from a financial institution, the security requirements data defining minimum security level requirements for the product; responsive to a request, receive real-time delivery option data from offices of the financial institution and external vendors, where the delivery option data is related to a plurality of real-time delivery options combinable to devise delivery plans; analyze the customer data, the rules data, and the delivery option data according to one or more algorithms; generate, based on analysis from the analyze operation, one or more delivery plans selectable by the customer for delivery of the product; transmit, via a network connection to an electronic device, the delivery plans to the customer; and receive selection of one of the delivery plans from the electronic device via the network connection.

19 Claims, 13 Drawing Sheets

(56) References Cited

U.S. PATENT DOCUMENTS

2017/0161725 A1* 6/2017 Hosp .................... G06Q 20/354
2017/0195449 A1* 7/2017 Mobbs ................ G06F 16/2455
2018/0204265 A1* 7/2018 Malviya ............. G06Q 30/0631

OTHER PUBLICATIONS

USPS, Postal Explorer: Priority Mail webpage <https://pe.usps.com/BusinessMail101?ViewName=PriorityMail> (<http://web.archive.org/web/20160807214010/https://pe.usps.com/BusinessMail101?ViewName=PriorityMail> captured on Aug. 7, 2016) (Year: 2016).*

USPS, Postal Explorer: First Class Mail webpage <http://pe.usps.com/BusinessMail101/Index?ViewName=FirstClassMail> (<http://web.archive.org/web/20160807213913/http://pe.usps.com/BusinessMail101/Index?ViewName=FirstClassMail> captured on Aug. 7, 2016) (Year: 2016).*

USPS, Postal Explorer: Sizes for Letters webpage <https://pe.usps.com/BusinessMail101?ViewName=Letters> (<https://web.archive.org/web/20161119180502/https://pe.usps.com/BusinessMail101?ViewName=Letters> captured on Nov. 19, 2016) (Year: 2016).*

Kim, "Lost Debit Card Replacement Fee Comparison at Top 10 U.S. Banks" webpage <https://www.mybanktracker.com/news/lost-debit-card-replacement-fee-comparison-top-10-us-banks>, Jul. 19, 2018 (Year: 2018).*

* cited by examiner

FIG. 9

900 (CUSTOMER DATABASE)

| | 910 | 920 | 930 | 940 | 950 | 960 | 970 | 980 | 990 |
|---|---|---|---|---|---|---|---|---|---|
| | LastName | FirstName | Password | HomeAddr | AcentBal | FeeFreeDeliv | FeePdDeliv | DigDeviceId | |
| 905 | | | | | | | | | |
| 915 | Doe | John | ******** | 123 ABC Lane | $200,000.00 | 7 | 0 | 9Jims4G | *** |
| 925 | Doe | Mary | ******** | 345 DEF Road | $5,000.00 | 1 | 0 | oop58HKS | *** |
| 935 | Doe | Jimmy | ******** | 6789 GHI Street | $798.00 | 0 | 1 | KWkus34cp | *** |
| 945 | *** | *** | *** | *** | *** | *** | *** | *** | *** |

FIG. 10

1000 (DELIVERY RULES DATABASE)

| | 1010 | 1020 | 1030 | 1040 | 1050 | 1060 | 1070 | 1080 |
|---|---|---|---|---|---|---|---|---|
| | AcentBalRange | DelivFee | DelivItem | BranchSecurReqPerson | BranchSecurReqEquip | DelivSecurEquipReq | DelivSecurPersonReq | |
| 1005 | | | | | | | | |
| 1015 | $0.01-$1000.00 | Actual Cost | ApinPaperwork | None | SealedEnvelope | NA | None | *** |
| 1025 | $1000.01-$5000.00 | First Free | Cash | 1Banker | SealedEnvelope | LockBox | 3YrCleanBackground | *** |
| 1035 | $5000.01+ | Unlim Free | Cashier Check | 1Banker | SealedEnvelope | LockBox | 3YrCleanBackground | *** |
| 1045 | | | Credit Card | 2Bankers | C.Equip/SealEnvelope | NA | 5YrCleanBackground | *** |
| 1055 | | | Notary | Licensed | NA | NA | NA | *** |
| 1065 | | | *** | *** | *** | *** | *** | *** |

FIG. 11

1100 (BRANCH STATUS DATABASE)

| | 1110 | 1120 | 1130 | 1140 | 1150 | 1160 | 1170 | 1180 |
|---|---|---|---|---|---|---|---|---|
| | BranchDesignat | BranchAddr | BranchCity | BranchState | BranchGpsCoordin | BranchBusHours | BranchPersonnel | BranchEquip |
| 1105 | | | | | | | | |
| 1115 | B0 | 987 1st Street | Wash., D.C. | Wash., D.C. | 82o3... | 09:00-17:00 | 1Bank/3Teller | Yes |
| 1125 | B1 | 204 Main Street | Atlanta | Georgia | 27o29... | 09:00-17:00 | 2Bank/3Teller/3Runner | Yes |
| 1135 | B2 | 7 West Road | Atlanta | Georgia | 23Rg... | 09:00-17:00 | 1Bank/4Teller/3Runner | Yes |
| 1145 | B3 | 88 Long Blvd. | Atlanta | Georgia | 85k8a... | 09:00-15:00 | 2Bank/5Teller | Yes |
| 1155 | B4 | 33 Third Road | Monroe | Georgia | 3gv2a... | 09:00-17:00 | 1Bank/3Teller | No |
| 1165 | *** | *** | *** | *** | *** | *** | *** | *** |

FIG. 12

1200 (DELIVERY OPTION DATABASE)

| | 1210 | 1220 | 1230 | 1240 | 1250 | 1260 | 1270 | 1280 |
|---|---|---|---|---|---|---|---|---|
| | DelivInitDesignat | DelivAreaCity | DelivAreaState | DelivGpsCoordin | DelivSecurPersonReq | DelivSecurEquip | DelivCost | |
| 1205 | | | | | | | | |
| 1215 | D1 | Atlanta | Georgia | Zykxw... | 1YrCleanBackground | None | $8.00 | *** |
| 1225 | D2 | Atlanta | Georgia | k8Fk... | 3YrCleanBackground | LockBox/Armed | $20.00 | *** |
| 1235 | D3 | Atlanta | Georgia | POpOo... | 3YrCleanBackground | LockBox | $10.00 | *** |
| 1245 | D4 | Monroe | Georgia | qWFF3... | 3YrCleanBackground | LockBox | $10.00 | *** |
| 1255 | *** | *** | *** | *** | *** | *** | *** | *** |

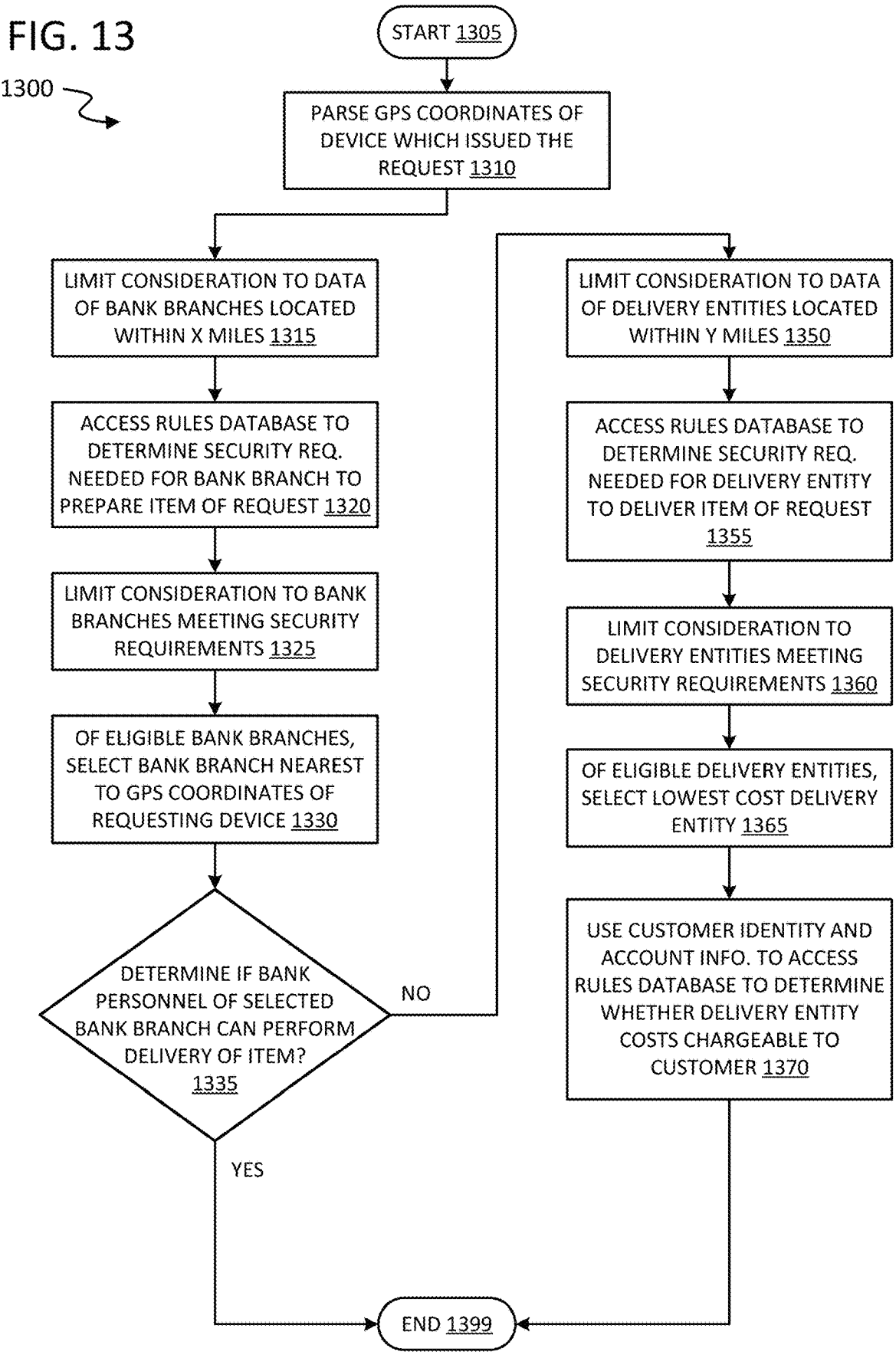

US 10,909,493 B1

ORCHESTRATION LAYER ARRANGEMENTS FOR DETERMINING A DELIVERY OPTION AND ORCHESTRATING DELIVERY

TECHNICAL FIELD

Examples described herein are generally related to orchestration layer arrangements for determining a delivery option and for orchestrating delivery. More particularly, examples are related to an orchestration layer capable of analyzing plural delivery options to determine and present limited delivery options to a customer, and for conveying logistics instructions regarding the delivery.

BACKGROUND

Delivery options for delivering products and/or services between a business entity and a customer may have been limited in number and complexity in the past. For example, if a financial institution (e.g., a bank) needed to deliver a replacement credit card to a customer who had lost his/her credit card, delivery choices to get the replacement credit card to the customer may have been limited. For example, the bank may have had an internal policy which required all replacement credit cards to be generated and mailed from a single centralized facility and that the replacement credit card be mailed only to the customer's home address. While past customers may have tolerated limited delivery options, today's contemporary and digitally-savvy customers may be unsatisfied with such limited delivery options. Such unsatisfied customers may show their dissatisfaction by moving their business or transactions to a differing business entity (e.g., a differing bank) which offers a greater array of, or more customer-convenient, delivery options.

What is needed are arrangements facilitating the offering and determination of a greater array of, and more customer-convenient, delivery options.

SUMMARY

Provided are orchestration layer arrangements for determining a delivery option and for orchestrating delivery. That is, a first example embodiment is directed to a delivery orchestration method comprising:
determining, based on a financial institutional database comprising customer data, rules data, and security requirements data, customer eligibility for delivery of a product to a customer and from a financial institution, the security requirements data defining minimum security level requirements for the product;
responsive to a request for the product, receiving real-time delivery option data from offices of the financial institution and external vendors, where the delivery option data is related to a plurality of real-time delivery options which are combinable to devise a plurality of delivery plans;
analyzing the customer data, the rules data, and the delivery option data according to one or more algorithms;
generating, based on analysis from the analyzing, one or more delivery plans selectable by the customer for delivery of the product;
transmitting, via a network connection to an electronic device, the one or more delivery plans to the customer; and receiving selection of one of the delivery plans from the electronic device via the network connection.

Another example embodiment is directed to a non-transitory computer-readable medium storing instructions which when executed by a processor cause the processor to: access a financial institutional database including customer data, rules data and security requirements data, to determine customer eligibility for delivery of a product to a customer from a financial institution, the security requirements data defining minimum security level requirements for the product;
responsive to a request for the product, receive real-time delivery option data from offices of the financial institution and external vendors, where the delivery option data is related to a plurality of real-time delivery options which are combinable to devise a plurality of delivery plans; analyze the customer data, the rules data, and the delivery option data according to one or more algorithms;
generate, based on analysis from the analyze operation, one or more delivery plans selectable by the customer for delivery of the product;
transmit, via a network connection to an electronic device, the one or more delivery plans to the customer; and receive selection of one of the delivery plans from the electronic device via the network connection.

Still further, another example embodiment is directed to a system, comprising: a processor; and
a memory storing instructions which when executed by the processor cause the processor to: access a financial institutional database including customer data, rules data and security requirements data, to determine customer eligibility for delivery of a product to a customer from a financial institution, the security requirements data defining minimum security level requirements for the product;
responsive to a request for the product, receive real-time delivery option data from offices of the financial institution and external vendors, where the delivery option data is related to a plurality of real-time delivery options which are combinable to devise a plurality of delivery plans; analyze the customer data, the rules data, and the delivery option data according to one or more algorithms;
generate, based on analysis from the analyze operation, one or more delivery plans selectable by the customer for delivery of the product;
transmit, via a network connection to an electronic device, the one or more delivery plans to the customer; and receive selection of one of the delivery plans from the electronic device via the network connection.

It is to be understood that both the foregoing general description and the following detailed description are example embodiments and explanatory only and are not restrictive of the disclosed embodiments, as claimed.

BRIEF DESCRIPTION OF THE DRAWINGS

FIG. 9 illustrates an example Customer Database 900.

FIG. 10 illustrates an example Delivery Rules Database 1000.

FIG. 11 illustrates an example Branch Status Database 1100.

FIG. 12 illustrates an example Delivery Option Database 1200

FIG. 13 illustrates an example flow which may be conducted by the orchestration layer (OL).

DETAILED DESCRIPTION

Examples discussed herein are generally related to orchestration layer arrangements for assisting in determination of a delivery service. More particularly, examples discussed herein are related to an orchestration layer capable of orchestrating decisions and logistics regarding delivery of products and/or services between a business entity and a customer thereof. That is, the orchestration layer coordinates determination and presentation of delivery options to the customer, the determination of the logistics for preparation and handling of the requested product or service, and conveys the logistics for delivery of the requested product or service.

Discussions of embodiments of the disclosure may utilize the example of delivery of a credit card from a financial institution (e.g., a bank) to a customer. However, the disclosure is not limited to use only in a financial institution (e.g., banking) environment or only to a credit card as a delivery product. Instead, the disclosure is equally applicable to any example entity which delivers any type of product and/or service to a customer.

Figure 1:
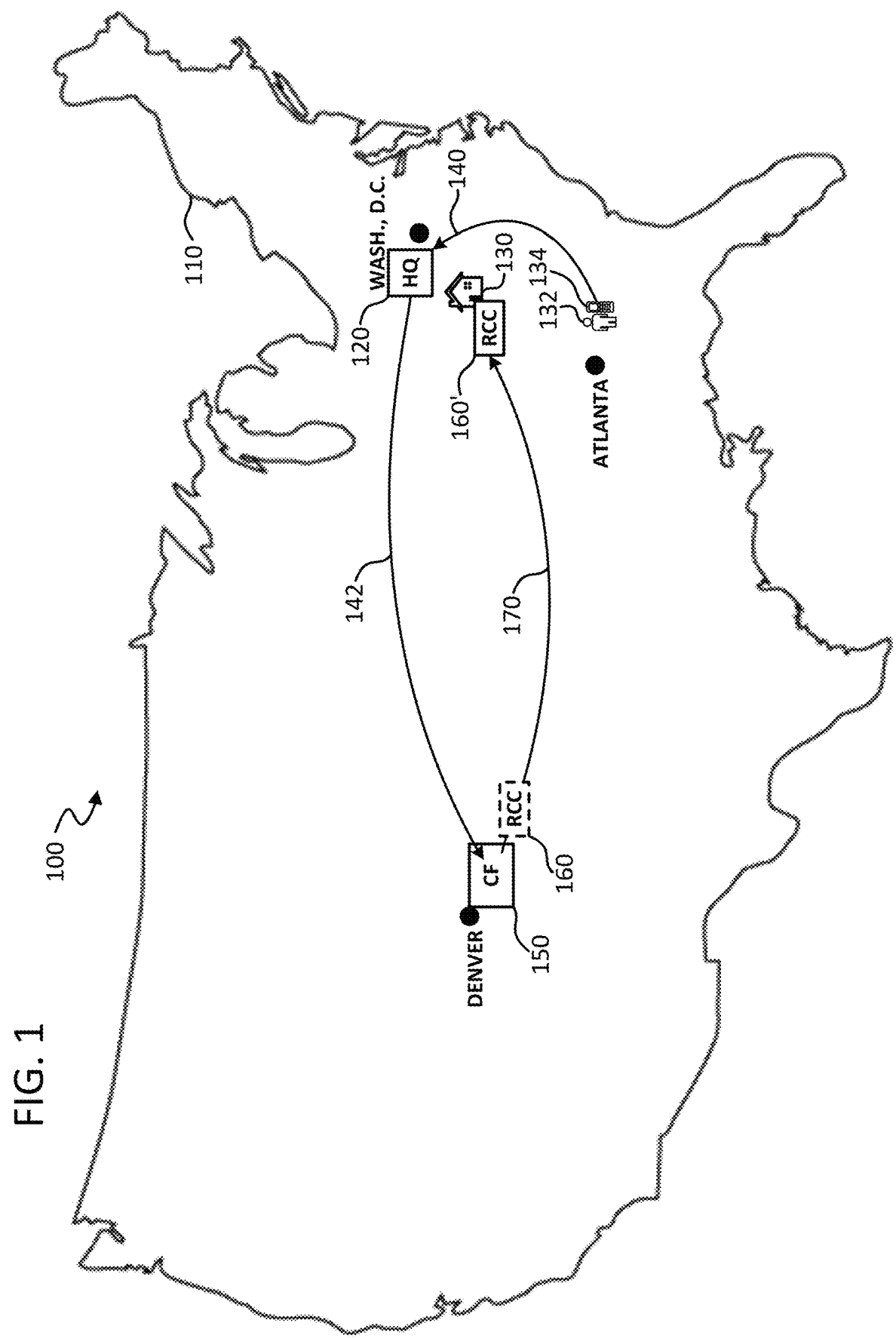
FIG. 1 illustrates an example geographical map illustration 100 useful to help describe an example background.

FIG. 1 illustrates an example geographical map illustration 100 having various items interposed thereon which are useful to help describe an example background. More particularly, illustrated within such national geographical map illustration 110 are several example localized areas, i.e., Atlanta, Denver, and Washington, D.C. Shown proximate to the Washington, D.C. area is a bank's headquarter (HQ) facility 120. Further shown proximate to the Washington, D.C. area is a home 130 of a customer 132.

In the example of FIG. 1, the customer 132 is shown as having left his home 130 and personally traveled to the Atlanta area with his/her cellular mobile device 134. At some unfortunate point while present in the Atlanta area, the customer 132 realizes that he/she has lost a credit card (CC) which had been issued by the bank. Assume that the customer is highly dependent upon the availability and use of the credit card during his/her continued presence within the Atlanta area. As examples, the customer may need his/her credit card to pay for localized travel, gasoline, meals, hotels, etc. Accordingly, upon realization of the loss, the customer 132 may telephone the bank's HQ facility 120, for example, to report the credit card loss and to request a replacement credit card. Such communication is shown illustratively within the FIG. 1 example, by the solid-line arrow 140.

In the example depicted in FIG. 1, the bank may have an internal rule or policy which requires all replacement credit cards to be generated and mailed from a single centralized facility (CF) 150 which is located, for example, in the Denver area. Accordingly, the bank's HQ communicates (shown illustratively by the solid-line arrow 142) an order to have the CF 150 prepare and issue a replacement credit card (RCC) 160 (see dashed-line iteration) for the customer 132. The CF 150 has credit card blanks, impression machinery, software, etc., to enable it to prepare and deliver the RCC 160 to the customer 132.

Furthermore, the bank may have an internal rule or policy which requires that credit cards be sent only to the customer's home address. Such delivery from the CF 150 to the customer's home 130 is shown illustratively by the combination of the FIG. 1 solid-line arrow 170 and the solid-lined RCC 160'. Specific delivery entities that may be used may be limited in that the bank may have a relationship with a specific delivery vendor (e.g., FedEx; USPS) to send all replacement credit cards via the vendor's overnight delivery service.

The delivery example in FIG. 1 may be disadvantageous to the customer 132 in several ways. First, because the RCC 160 is prepared and sent from a geographical location which is significantly distanced from the customer's home 130 and/or the present location of customer 132, there exists an inherent and significant (e.g., an overnight) delay before the RCC 160 can be delivered. In addition, unless the card was requested and prepared for courier pickup by a predetermined overnighting deadline (e.g., 2:00 pm), it may actually take two (2) or more days before the RCC 160 is delivered.

As another customer disadvantage, given the bank policy that the RCC 160 is required to be delivered to the customer's home 130 rather than the customer 132, the RCC 160' would remain in the customer 132's mail pile and be physically inaccessible to the customer 132 until the customer 132 returned to the home 130 in Washington, D.C. That is, the RCC 160' could not be used while the customer 132 continued his/her trip within the Atlanta area, and needed to pay for localized travel, gasoline, meals, hotels, etc.

In view of the above, the customer 132 may be severely disappointed and/or inconvenienced on his/her continued Atlanta area travels, and as a result, may become dissatisfied with the bank. Such may result in the customer showing their dissatisfaction by moving their business or transactions to a differing business entity (e.g., a differing bank) which offers a greater array of, or more customer-convenient, delivery options.

Figure 2:
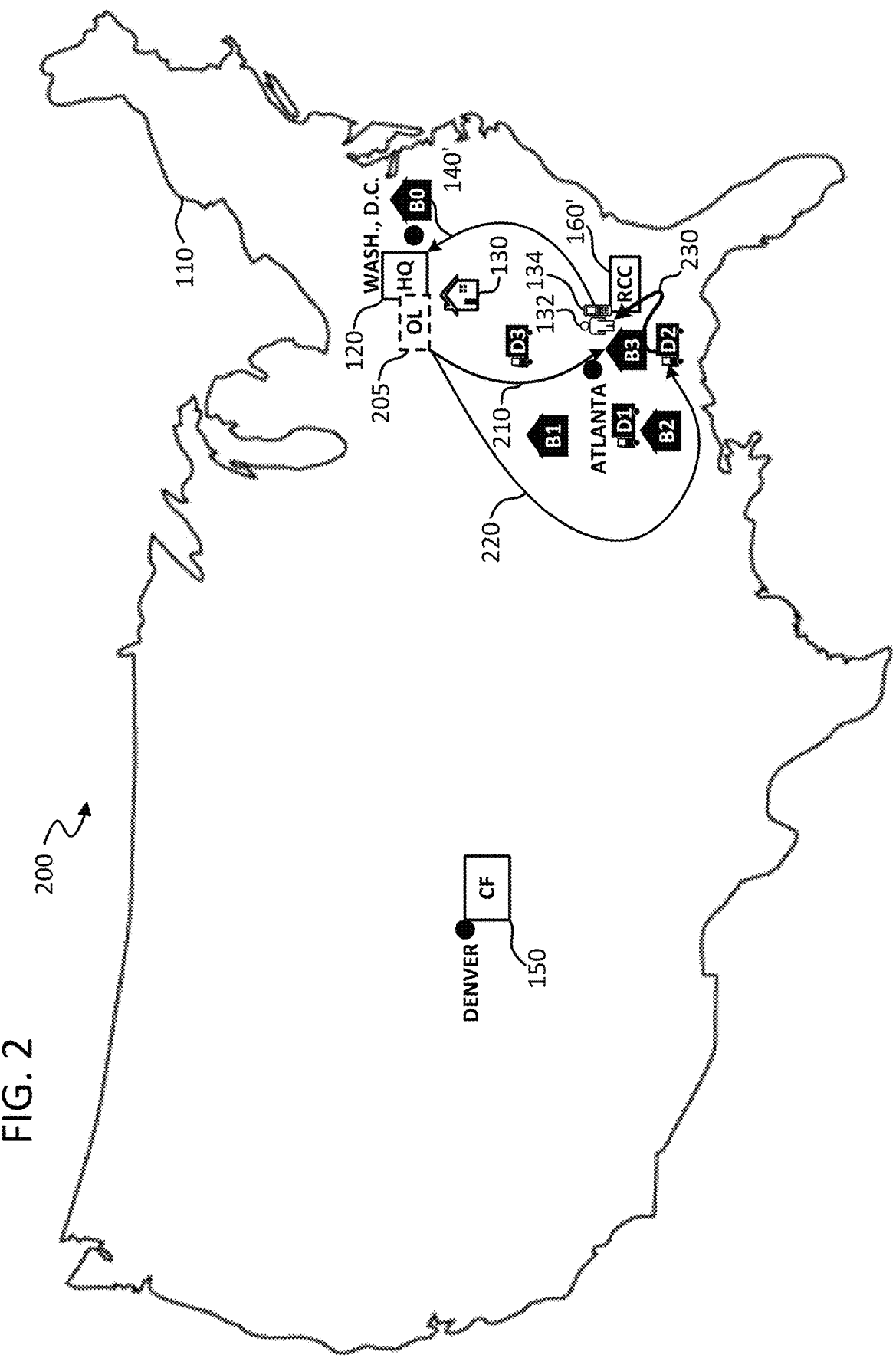
FIG. 2 illustrates an example geographical map illustration 200 having additional alternative delivery options.

FIG. 2 illustrates an example geographical map illustration 200 having additional alternative delivery options. More particularly, in the example, bank branches B0, B1, B2 and B3 (located in the Washington, D.C. and Atlanta areas) offer additional facilities (in addition to the CF 150) which may be able to prepare and issue an RCC 160 to the customer 132. That is, in addition to the CF 150, one or more of the bank branches B0-B4 may have credit card blanks, impression machinery, software, etc., to enable it to prepare and issue the replacement credit card (RCC) 160 to the customer 132. Accordingly, while the remote CF 150 might still be used to prepare and send replacement credit cards which are of a routine non-time-critical nature, one or more of the bank branches B0-B4 which are more local (i.e., closer) to the real-time location of the customer 132 may be available to prepare and deliver a replacement credit card of a more-time-critical nature more quickly to the customer 132.

Regarding example bank branches, a single local bank branch B0 may be within the Washington, D.C. area, while three (3) local bank branches B1-B3 may be within the Atlanta area. Given that the customer 132 is presently within the Atlanta area, the Atlanta bank branches B1-B3 would be considered as best candidates to satisfy any time-critical need for the replacement credit card, rather than the Washington, D.C. bank branch B0 and the CF 150. That is, due to the shorter physical distance between the customer 150 and the bank branches B1-B3, in comparison to the greater physical distance between the customer 150 and the Washington, D.C. bank branch B0 or CF 150, the replacement credit card may be delivered faster from the nearby Atlanta bank branches B1-B3 to the Atlanta-located customer 150.

Regarding possible delivery of the replacement credit card from the bank branches B1-B3 to the customer 132, there may exist a situation where the customer 132 is able to physically visit one of the bank branches B1-B3 to personally pick up the replacement credit card. In contrast, there may exist a situation where the customer 132 is not able to physically visit any of the bank branches B1-B3, but instead, requests delivery to the present location of the customer 132 or some other agreed-upon location. One example where the customer 132 might not be able to visit the bank branches B1-B3 is a situation where the customer 132 is on business travel to Atlanta and is obligated to attend business meetings throughout the day. That is, the customer 132 cannot travel to any bank branch B1-B3 during the normal business hours (e.g., 9:00 am-5:00 pm) of the bank branches.

As another example, there may exist a situation where a bank branch so happens to have an on-the-clock employee (e.g., a "runner") with unused bandwidth which would make the bank employee available to personally deliver the product or service directly to the customer or to an agreed-upon location (e.g., a reception desk at the customer's hotel). In contrast, there may exist a situation where no on-the-clock employee has unused bandwidth, such that the bank branch would need a non-bank (e.g., external) delivery personnel or service to deliver the product and/or service to the customer.

In view of the above, a plurality of candidate delivery entities D1-D3 are further illustrated within the Atlanta area. While the delivery entities D1-D3 are shown representatively in FIG. 2 as truck icons, the delivery entities are in no way limited to delivery via trucks. That is, each delivery entity may instead be any of differing known delivery modes, for example, a non-limiting list includes: a pedestrian courier; a bicyclist courier; a motorbike courier; a car, sports utility vehicle (SUV) courier; an autonomous vehicle courier; a drone courier, etc.

In some examples, a significant number of bank branches may be able to prepare and facilitate the delivery of the replacement credit card to the customer. In such examples, determination of exactly which bank branch or combination of branches is best to accomplish the preparation and/or delivery is complex, and there may be limited time to make such decision. Further, if there are a significant number of delivery entities which may be used to make the delivery, again it may be a complex decision to determine which is the best delivery entity or combination of delivery entities that should be used. Again, there may be limited time within which to make such a decision.

To assist in such decisions, embodiments disclosed herein may provide an orchestration layer (OL) 205 as shown in FIG. 2. In the example, the OL 205 is depicted residing at the bank's headquarter (HQ) facility 120. Such OL 205 may be embodied as software, hardware or as a software/hardware combination within one or more server (see FIG. 15) maintained, for example, at the bank's headquarter (HQ) facility 120. The OL 205 is not limited to being maintained at the bank's headquarter (HQ) facility 120. As one example, the OL 205 or parts thereof may be maintained within a server of one or more of the bank branches B0-B4. As another example, the OL 205 or parts thereof may be maintained within a server of a third-party hosting entity, e.g., by contract between the bank and the third-party hosting entity. Example particulars of the OL 205 are described later within this disclosure.

In further discussion of FIG. 2, a generalized flow of events which may occur with the FIG. 2 example arrangement, might be as follows. More particularly, upon realization of the loss of the credit card, the customer 132 may utilize an application (also referred to as an "app") on his/her mobile device to contact the bank's HQ facility 120, for example, to report the credit card loss and to request a replacement credit card. Such communication is shown illustratively within the FIG. 2 example illustration, by the solid-line arrow 140'. At the bank's HQ facility 120, any request for a replacement credit card may be forwarded to the OL 205.

Upon receipt of the request, the OL 205 may leverage compiled information into consideration in the determination of a delivery option. For example, the OL 205 may consider each of the Atlanta bank branches B1-B3 as candidate facilities for preparation, handling, and/or delivery of the requested replacement card. The OL 205 may further consider each of the delivery entities D1-D3 for delivery of the replacement credit card.

In the example illustrated in FIG. 2, the OL 205 may determine and present limited delivery options to a customer. Doing so may allow the customer to select a delivery option which is best suited to the customer. Based upon the delivery option selected by the customer, the OL 205 may determine that the Atlanta bank branch B3 is the facility best-suited for preparation and handling of the replacement credit card requested. Furthermore, the OL 205 may determine that the delivery entity D2 is best-suited for delivery of the product or service requested. Responsive to customer selection of the proposed delivery option, the OL 205 communicates preparation/handling instructions (shown representatively by the solid-line arrow 210) to the bank branch B3, and communicates delivery instructions (shown representatively by the solid-line arrow 220) to the delivery entity D2.

Responsive to receipt of the preparation/handling instructions 210, one or more personnel within the bank branch B3 may complete (at least in part) preparation/handling of the replacement credit card requested by a scheduled pick-up time indicated within the preparation/handling instructions 210. Similarly, responsive to receipt of the delivery instructions 220, the delivery entity D2 (e.g., a bicycle courier) may arrive (shown representatively by the FIG. 2 solid-line arrow 230) at the bank branch B3 by the scheduled pick-up time. After completing pick-up of the replacement credit card at the bank branch B3, the delivery entity D2 travels to the delivery location indicated within the delivery instructions 220, for example, to deliver the replacement credit card (shown representatively by the solid-line arrow 230) by the scheduled delivery time. One non-limiting delivery location might be a reception desk of a hotel at which the customer 132 is staying at during his/her visit to Atlanta.

Figure 3:
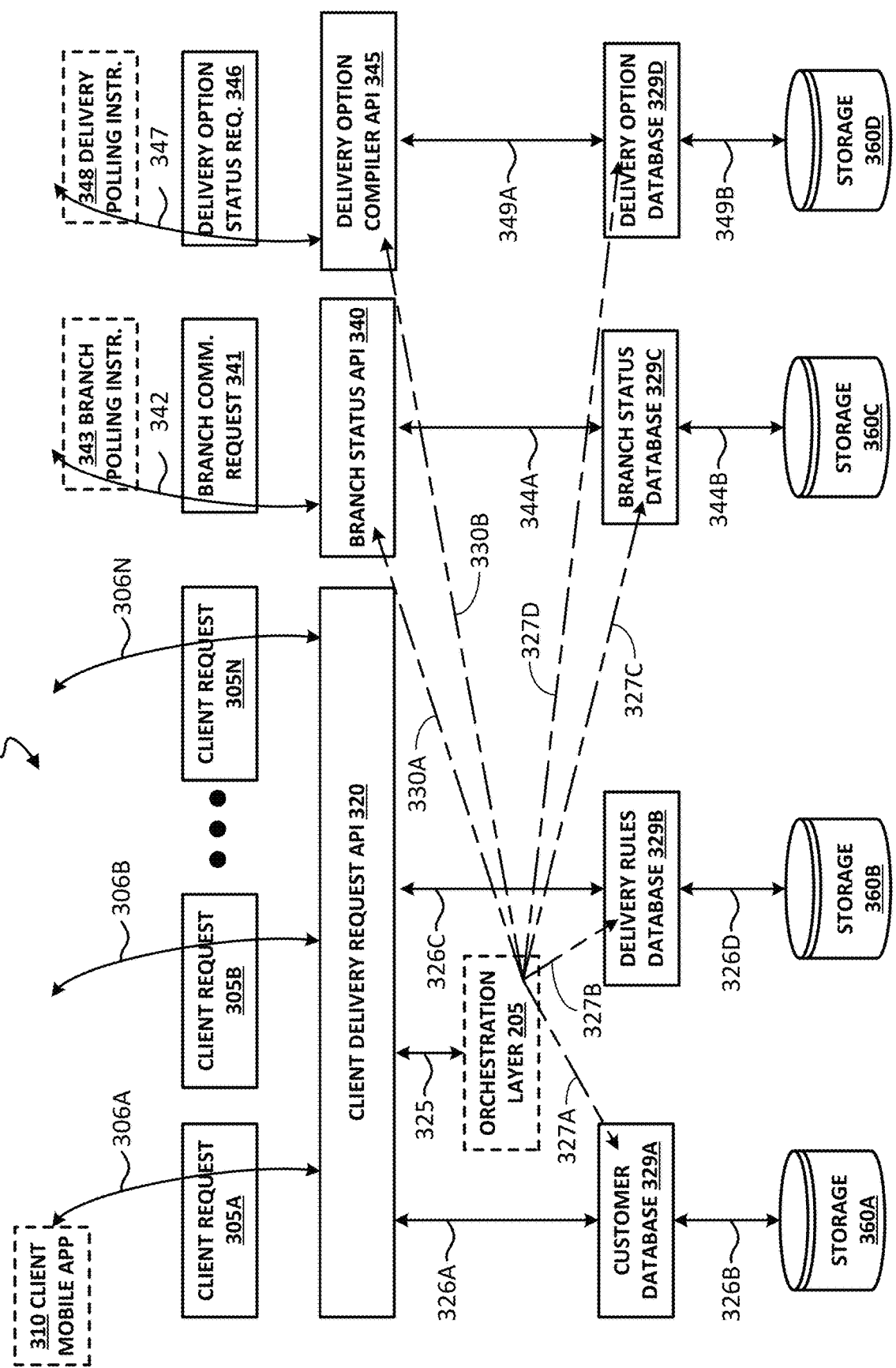
FIG. 3 is an example illustration 300 of a non-limiting orchestration layer (OL) arrangement.

In turning now to further details of the OL 205, the orchestration layer 205 may be designed for integrating two or more applications and/or services together to automate a process, or synchronize data in real-time. FIG. 3 is an example illustration 300 of a non-limiting OL 205. The OL 205 may be provided as a microservice, for example, for cooperating with one or more application programming interfaces (APIs) and/or accessing one or more databases.

More particularly, in FIG. 3, a client request 305A received via communication channel 306A from the customer 132 via a client mobile app 310 resident on the cellular mobile device 134 (FIG. 2), is received by a client delivery request API 320. The client mobile app 310 may be provided from the bank and may be downloadable by the customer from an app store onto the customer's mobile device 134.

The client delivery request API 320 may be configured to handle plural other client requests 305B to 305N emanating along communication channels 306B to 306N from other customers (not shown). However, for purposes of brevity and clarity, the description of FIG. 3 (and other FIGS.) will focus on handling only one (i.e., a single) client request 305A. The FIG. 3 example arrangement also has additional other types of APIs, for example, a Branch Status API 340 and a Delivery Option Compiler API 345. More detailed descriptions of these other types of APIs are provided later in this disclosure.

Figure 4:
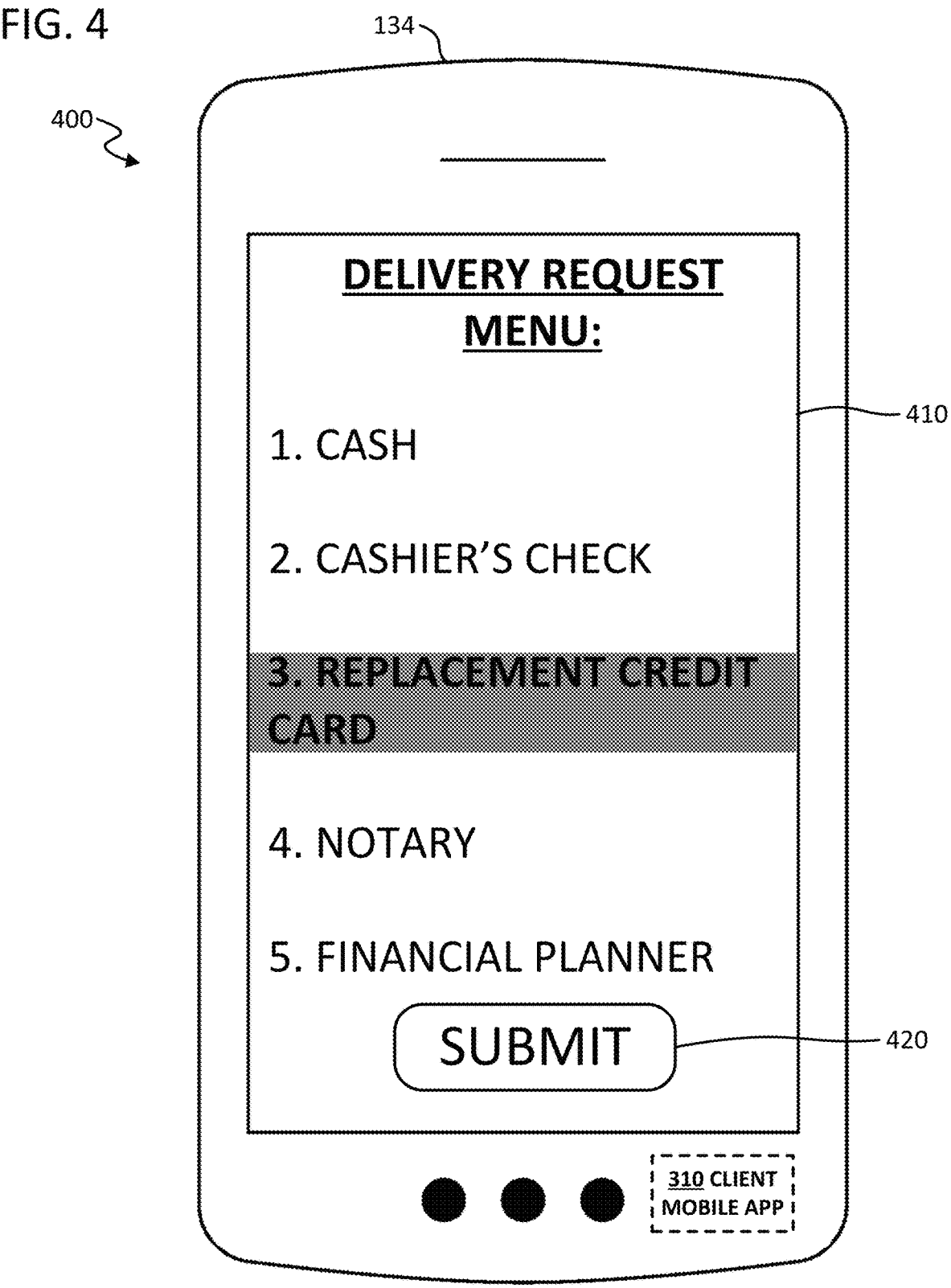
FIG. 4 is an example illustration 400 of a customer's mobile device 134 having a client mobile app 310 downloaded therein, and with display of a delivery request menu.

FIG. 4 is an example illustration 400 of the customer's mobile device 134 executing the client mobile app 310. Responsive to realization of the card loss, the customer 132 can run (i.e., start) the client mobile app 310. The customer can then make selections on one or more menus or icons, to display a Delivery Request Menu on a display screen 410 of the mobile device 134. In the example of FIG. 4, the "Delivery Request Menu" may include the example delivery request items of: 1. Cash; 2. Cashier's Check; 3. Replacement Credit Card; 4. Notary; and, 5. Financial Planner. In such an example, the Cash, Cashier's Check, and Replacement Credit Card may represent products, while the Notary and Financial Planner may represent services.

In the example at hand, the customer manipulates the mobile device 134's input devices (e.g., keyboard, touch screen, etc.) to select (shown representatively by bolding) the "3. Replacement Credit Card" item. The user may then click the Submit 420 button to transmit the request to the bank. The client request 305A may be embodied as one or more Internet-based packets. The client request 305A may further include information identifying the customer, the mobile device, that the request is a replacement credit card request, and, the GPS coordinates of the mobile device.

Figure 5:
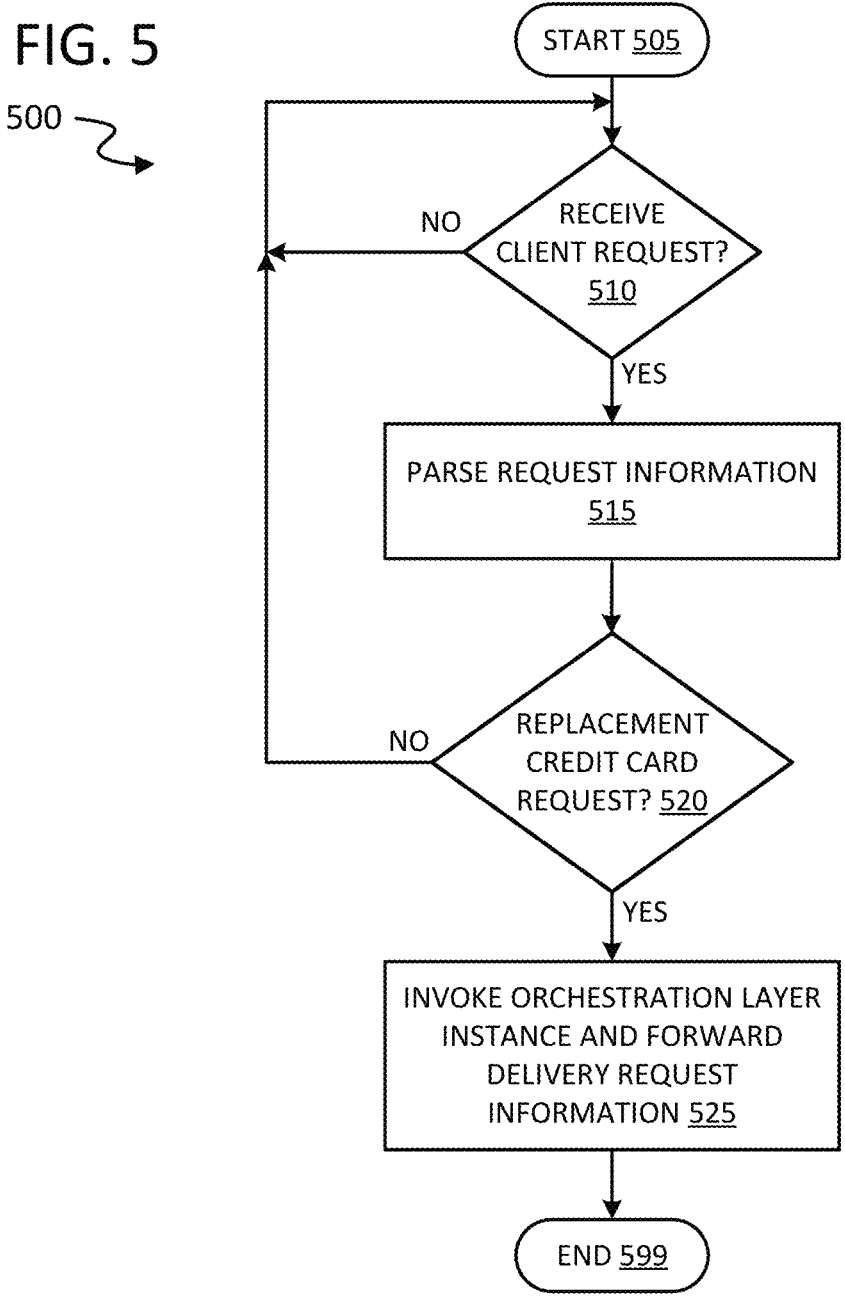
FIG. 5 illustrates an example flow 500 which may be conducted by a Client Delivery Request API.

FIG. 5 illustrates an example flow 500 which may be conducted by the Client Delivery Request API 320 with regard to replacement credit card requests. After Starting (block 505), the API 320 monitors whether a client request has been received (block 510). If "NO", the monitoring continues to loop via the NO branch. If a client request is received ("Yes" branch), then at block 515 the API 320 utilizes parsing (or some other type of recognition) of the contents of the request packet to extract information from the request. At block 520, the API 320 determines whether the request is a replacement credit card request. If "NO", the monitoring resets via the NO branch. If the request is for a replacement credit card ("YES" branch), then at block 525, the Client Delivery Request API 320 invokes a running instance of the OL 205 as a microservice. Furthermore, the Client Delivery Request API 320 may store information content of the client request 305 in a predetermined storage (e.g., memory, hard disk drive (HDD), etc.) location. Still further, the Client Delivery Request API 320 may transmit, at block 525, the following information to the OL 205 instance: the customer's or mobile device's identification; that the request is a replacement credit card request; and, the GPS coordinates of the mobile device. At block 599, the FIG. 5 flow ends.

Figure 6:
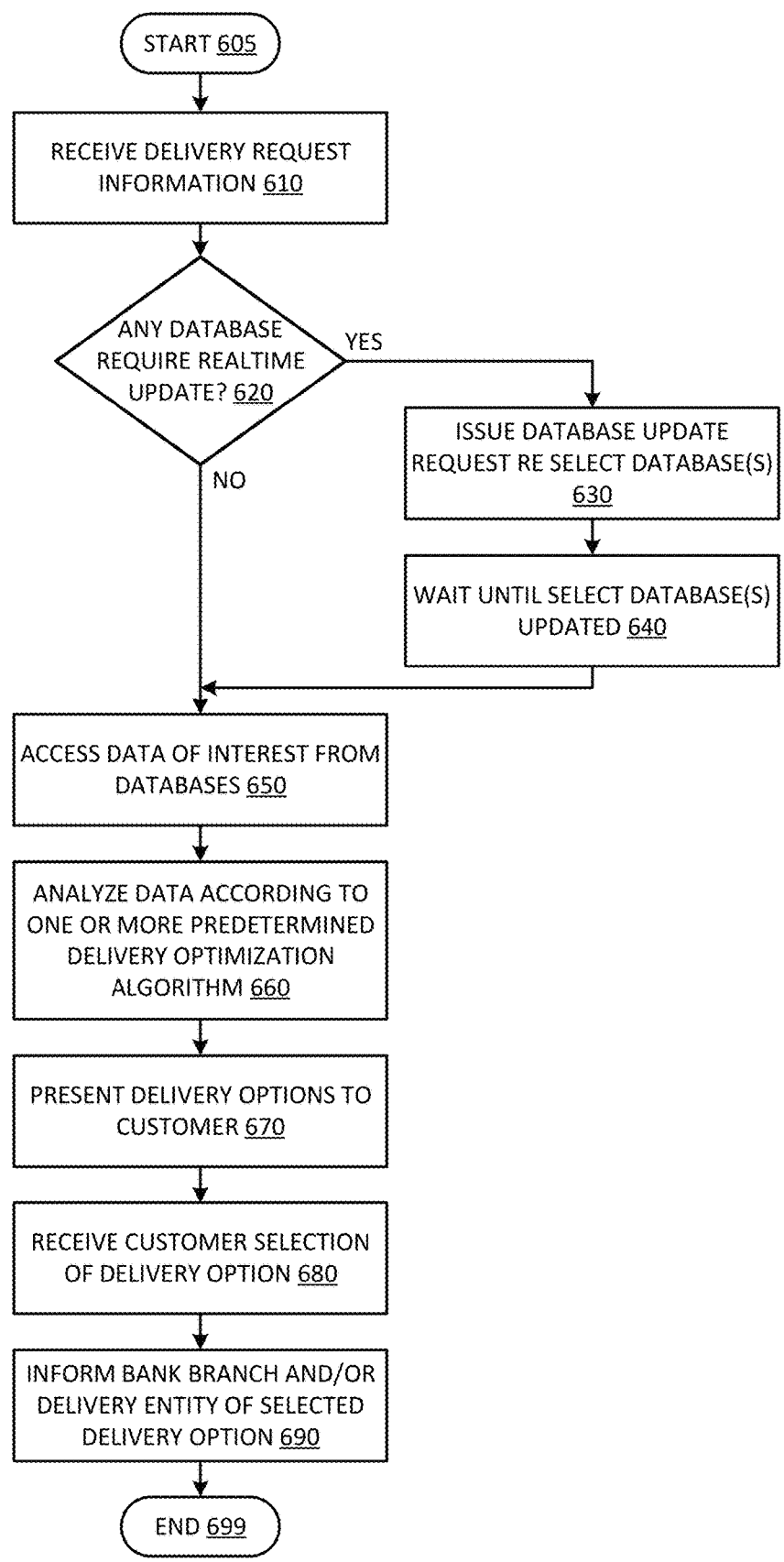
FIG. 6 illustrates an example flow 600 which may be conducted by an orchestration layer (OL).

FIG. 6 illustrates an example flow 600 which may be conducted by the OL 205. After Starting at block 605, the OL 205 receives delivery request information of the delivery request 305A at block 610. As will be described next, the OL205 may access and utilize data from a number of relevant databases. In order to make proper up-to-date decisions, it is important that any database data that the OL 205 accesses and utilizes is itself, up-to-date. Accordingly, the OL 205 determines whether there exists any database which requires real-time or near-real-time updating at block 620.

More particularly, for the OL 205 to orchestrate logistics and make decisions regarding delivery of products and/or services between a business entity and a customer thereof, the OL 205 will need to access and consider many types of supportive data. For example, the OL 205 may access and consider data from each of the following FIG. 3 databases: a bank's Customer Database 329A via an access operation 327A; a bank's Delivery Rules Database 329B via an access operation 327B; a bank's Branch Status Database 329C via an access operation 327C; and, a Delivery Option Database 329D via an access operation 327D. Such FIG. 3 databases 329A-329D are in no way limited to being stored in separate storages (e.g., 360A-360D) as shown, but instead may be provide in fewer storage devices or even a singular storage device. More detailed descriptions of example instances of each of these databases 329A-329D are provided later in this disclosure.

While some databases have data content which changes infrequently (i.e., is not very dynamic), some databases have data content which does change frequently (i.e., is very dynamic). As examples, the bank's Customer Database 329A and Delivery Rules Database 329B may contain data which is not very dynamic and does not change frequently (e.g., updated once or twice a day). In contrast, the bank's Branch Status Database 329C and Delivery Option Database 329D may contain data which is very dynamic and changes frequently (e.g., changes every hour or even fractions of an hour).

Accordingly, regarding any determination at FIG. 6 block 620 that databases having fast-changing dynamic data must be accessed, the OL 205 may be configured (via "Yes" branch) to preliminarily invoke a real-time or near-real-time updating of data content of such databases at block 630. For example, the OL 205 may invoke updating of any dynamic database before any database access operation 327A-327D is conducted. Such invoked updating serves to better guarantee that the OL 205 will make decisions based upon fresh (rather than stale, outdated) data. Accordingly, the FIG. 3 example arrangement further illustrates preliminary updating instructions 330A and 330B sent from the OL 205 to a Branch Status API 340, and a Delivery Option Compiler API 345, respectively.

Responsive to receipt of the updating instruction 330A, the Branch Status API 340 issues a Branch Communication Request 341 (via communications channel 342) to each bank branch. After establishing communications, the Branch Status API 340 issues a Branch Polling Instruction 343, for example, to the branch, to provoke receiving refreshed or updated branch status data from the branch. The Branch Status API 340 stores any received updated branch status data into the Branch Status Database 329C. Example branch status data which is obtained from each branch and stored into the Branch Status Database 329C, is described later in this disclosure.

Similarly, responsive to receipt of the updating instruction 330B, the Delivery Option Compiler API 345 issues a Delivery Option Status Request 346 (e.g., via communications channel 347) to each external delivery company provided on a bank-maintained delivery company list. Alternatively, the Delivery Option Status Request 346 may be sent externally to at least one developer entity (not shown) which itself polls and compiles delivery option status data from a multitude of delivery entities. After establishing communications, the Delivery Option Compiler API 345 issues a Delivery Polling Instruction 348 to the delivery entity (e.g., company) so as to receive refreshed or updated delivery option data from the entity. The Delivery Option Compiler API 345 stores any received updated delivery option data into the Delivery Option Database 329D. Example delivery option data which is obtained from each delivery entity and stored into the Delivery Option Database 329D will be described later within this disclosure.

Regarding the above, the OL 205's FIG. 6 flow waits (block 640) until updating of the select databases occurs, i.e., waits until stale data is refreshed with updated data.

Once updating is completed or if select updating was not required, then at block 650 the OL 205 accesses data of interest from: the bank's Customer Database 329A via an access operation 327A; the bank's Delivery Rules Database 329B via an access operation 327B; the bank's Branch Status Database 329C via an access 327C; and, a Delivery Option Database 329D via an access operation 327D.

At block 660, the data retrieved from the databases at block 650 is analyzed according to one or more predetermined delivery optimization algorithms. Descriptive examples of delivery optimization algorithms will be provided later in this disclosure. The analysis may generate a limited number of delivery option offerings for presentation to the customer. As one non-limiting example, two to five delivery options may be derived for presentation to the customer. As another non-limiting example, only one (i.e., a single) delivery option may be derived for presentation to the customer.

At block 670, particulars of any derived delivery options are presented to the customer. Such may be performed, for example, by the OL 205 and/or the client delivery request API 320 communicating with, and providing select delivery option data to, the client mobile app 310 of the client's mobile device 134 through the communications channel 306A (e.g., a network communications channel). The select delivery option data is then used to display selectable options on a display screen 410 of the client's mobile device 134.

Figure 7:
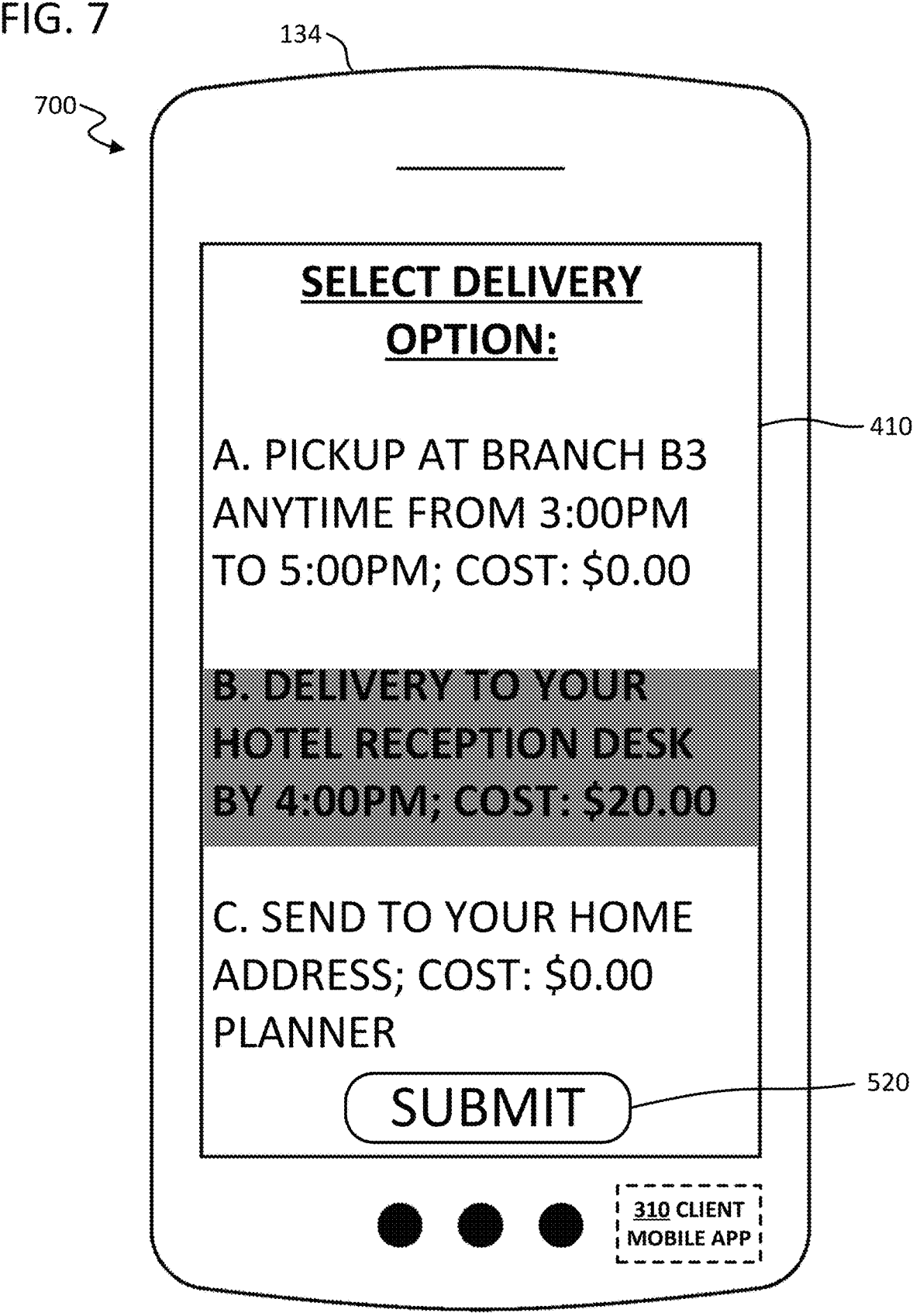
FIG. 7 is an example illustration 700 of the customer's mobile device 134, with display of three non-limiting example options.

FIG. 7 illustrates three non-limiting example options. More particularly, shown are options: A. Pick up at branch D2 anytime from 3:00 pm to 5:00 pm, Cost $0.00; B: Delivery to your hotel reception desk by 4:00 pm, Cost $20.00; and, C: Send to your home address, Cost $0.00. Once the customer clicks on a "Submit" button 520 to finalize his/her selection (shown representatively by bolding in FIG. 7), the client mobile app 310 of the client's mobile device 134 notifies the OL 205 and/or the client delivery request API 320 of the customer's selection through the communications channel 306A. For the sake of clarity, it will be assumed throughout this disclosure that the client mobile app 310 directly notifies the OL 205 of the selection.

Upon receipt (FIG. 6 operation 680) of the customer's selection, the OL 205 informs (operation 690) the bank branch and/or delivery entity of select delivery option data. In the FIG. 7 example, given that option "B: Delivery to your hotel reception desk by 4:00 pm, Cost $20.00" was selected by the customer, the OL 205 communicates preparation/handling instructions (shown representatively by the FIG. 2 solid-line arrow 210) to the bank branch B3, and communicates delivery instructions (shown representatively by the solid-line arrow 220) to the delivery entity D2. At block 699, the flow 600 ends.

Figure 8:
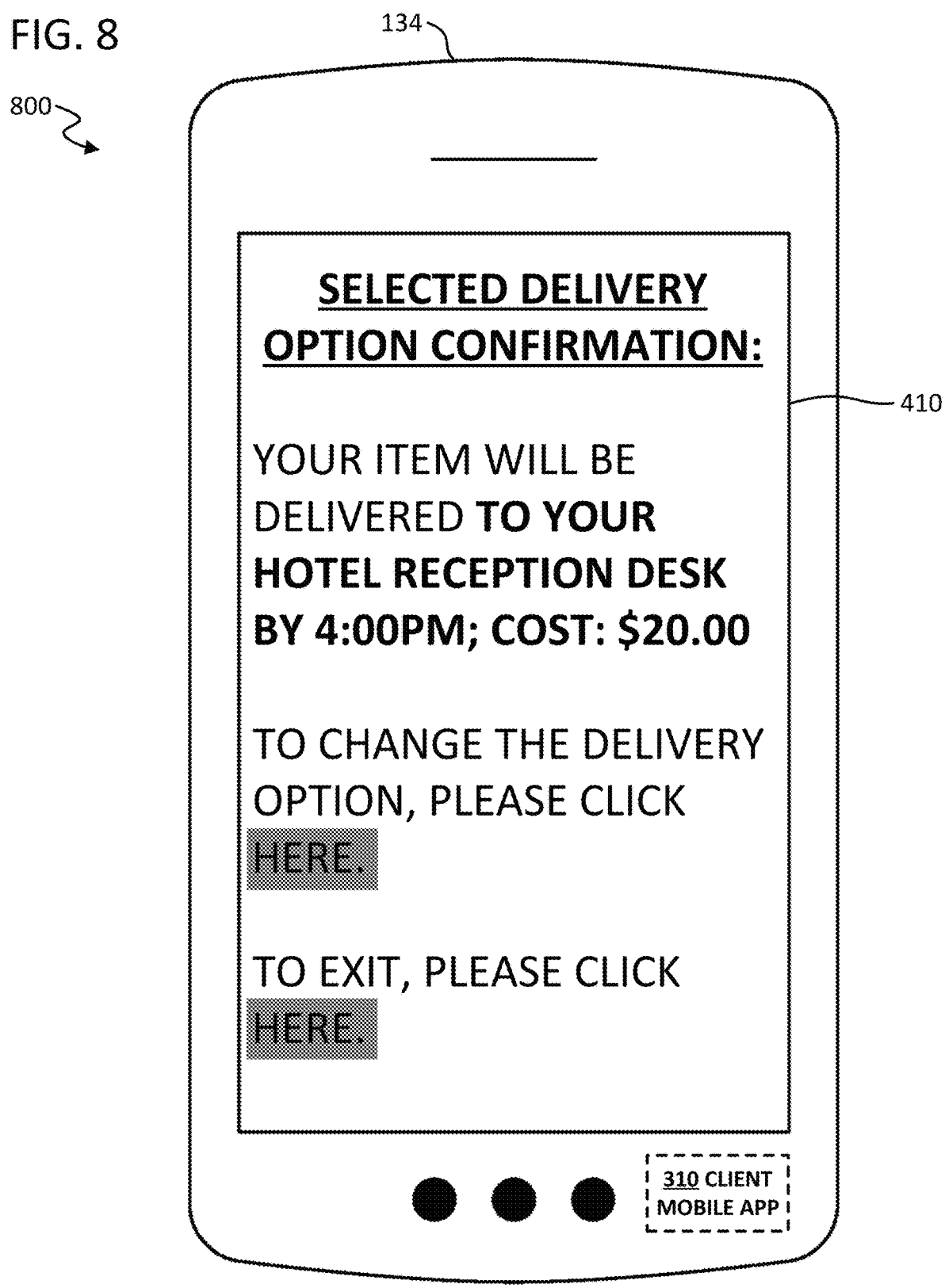
FIG. 8 is an example illustration 800 of the customer's mobile device 134, with display of a confirmation.

Although not depicted in the flow 600, the client mobile app 310 and/or the OL 205 may confirm the customer's selection back to the customer. More particularly, FIG. 8 illustrates an example confirmation 800 which might be displayed on the display screen 410 of the mobile device 134, i.e., "Your item will be delivered to your hotel reception desk by 4:00 pm, Cost $20.00." In addition to display of a confirmation, the display screen might also include additional selectable options, e.g., "To change the delivery option, please click HERE", and "To exit, please click HERE".

Description turns next to example database data which might be accessed and utilized by the OL 205 to determine and present delivery options to the customer, to coordinate the determination of the logistics for preparation and handling of the product or service requested, and/or to coordinate the logistics for delivery of the product or service requested.

More particularly, FIG. 9 illustrates an example Customer Database 900. Types of example data stored in the Customer Database 900 are depicted in separate columns and include: LastName 910; FirstName 920; Password 930; HomeAddr 940; AcentBal 950; FeeFreeDeliv 960; FeePdDeliv 970; and DigDevicId 980. In the depicted example, AcentBal 950 represents the monetary value of assets that the customer currently has in the bank; FeeFreeDeliv 960 compiles a number of no-cost (or free) deliveries that the customer has been provided with over a recent period of time (e.g., last 6 months); FeePdDeliv 970 compiles a number of customer-paid deliveries that the customer has paid for over the recent period of time; and DigDevicId 980 represents a digital identification number associated with the customer's digital device (e.g., a MAC address, serial number, etc. of the customer's cell phone). Column 990 having all " . . . " designations is representative of the fact that the example types of data illustrated and described with respect to FIG. 9 are non-limiting and non-exhaustive, and a multitude of other types of customer data types may be included therein. Further, not all the types of data illustrated in FIG. 9 are necessarily required to be within a Customer Database. Row 905 contains the labels for the types of data, whereas rows 915-935 each contain data for differing respective customers. Row 945 having all "●●●" designations is meant to be representative of the fact that data for a multitude of additional customers may be included within the Customer Database.

FIG. 10 illustrates an example Delivery Rules Database 1000. Types of data included within the Delivery Rules Database 1000 are depicted in separate columns. Furthermore, the columns in the database 100 are divided into two group types which may be divided as left and right of the FIG. 10 bolded vertical border between columns 1020 and 1030. More particularly, a first group of columns are directed to rules defining whether the actual delivery fee is chargeable to the client or not, based upon an account balance. Such first group of columns may include AcentBalRange 1010 and DelivFee 1020. According to the stated rules, a customer having a lower present account balance (e.g., below $1000.00) would, according to the rule in row 1015, be charged the actual cost of any delivery fee incurred in a delivery requested by the customer. Further, as shown by row 2015, any customer having a balance between $1000.01-$5000.00 would be entitled to one free first delivery (within every predetermined period of time, e.g., 6 months). In contrast, a customer having a high account balance (e.g., $5000.01 and above), would be given the bank courtesy of having unlimited free deliveries between the bank and the customer.

The second group of columns (to the right of the bolded vertical border between columns 1020 and 1030) define types of security precautions which are required per bank policy for differing types of delivery items. Such second group of columns may include: DelivItem 1030; BranchSecurReqPerson 1040; BanchSecurReqEquip 1050, DelivSecurEquipReq 1060 and DelivSecurPersonReq 1070. According to the stated rules, a customer's delivery request for delivery of application paperwork (row 1015) would have low security requirements per bank policy. For example, for row 1015, column 1040 indicates there are no special security required for bank branch personnel or delivery personnel in preparing or handling the paperwork, and column 1050 indicates that a sealed envelope is required to contain paperwork leaving the bank branch. As another example, there are stricter security requirements for handling and delivery of cash (row 1025), i.e., only one banker is required to count and sign off on the cash (column 1040), a sealed envelope is required to contain the cash leaving the bank branch (column 1050), the delivery entity (e.g., courier with car) must have a lock box (e.g., lockable glove compartment) per column 1060, and the delivery personnel handling the cash delivery must have a minimum three (3) year clean background check (e.g., no arrests or convictions for the most recent three years) per column 1070.

Column 1080 having all "●●●" designations is meant to be representative of the fact that the example types of data illustrated and described with respect to FIG. 10 are non-limiting and non-exhaustive, and a multitude of other types of delivery rules data may be included therein. Further, not all the types of data illustrated in FIG. 10 are necessarily required to be within a Delivery Rules Database. Row 1005 contains the labels for the types of data, whereas rows 1015-1055 each contain data for differing permeations of the rules. Row 1065 having "●●●" designations is meant to be representative of the fact that data for a multitude of additional permeations may be included within the Customer Database.

FIG. 11 illustrates an example Branch Status Database 1100. Types of data stored in the Branch Status Database 1100 are depicted in separate columns and may include: BranchDesignat 1110; BranchAddr 1120; BranchCity 1130; BranchState 1140; BranchGpsCorrdin 1150; BranchBusiHours 1160; BranchPersonnel 1170; BranchCcEquip 1180. BranchGpsCoordin 1150 is associated with the global positioning coordinates of the bank branch, which might be used to compare a distance closeness of the bank branch to the present (i.e., real-time or near-real-time) GPS coordinates of the customer. BranchPersonnel 1170 defines personnel who are currently working (i.e., on-the-clock) at the bank branch. BranchCcEquip 1180 indicates whether or not the bank branch presently has working equipment and supplies for preparing a credit card.

Column 1190 having all "●●●" designations is meant to be representative of the fact that the example types of data illustrated and described with respect to FIG. 11 are non-limiting and non-exhaustive, and a multitude of other types of branch status data types may be included therein. Further, not all the types of data illustrated in FIG. 11 are necessarily required to be within a Branch Status Database. Row 1105 contains the labels for the types of data, whereas rows 1115-1155 each contain data for differing respective branch. Row 1165 having all "●●●" designations is meant to be representative of the fact that data for a multitude of additional branches may be included within the Branch Status Database.

FIG. 12 illustrates an example Delivery Option Database 1200. Types of data that may be stored in the Delivery Option Database 1200 are depicted in separate columns and may include: DelivEntitDesignat 1210; DelivAreaCity 1220; DelivAreaState 1230; DelivGpsCoordin 1240; DelivSecurPersonCred 1250; DelivSecurEquip 1260; DelivCost 1270. DelivGpsCoordin 1240 is associated with real-time or near-real-time global positioning coordinates of the delivery entity (e.g., in-the-field courier), which might be used to compare a present distance closeness of the courier to the GPS coordinates included with the original request. DelivSecurPersonCred 1250 is associated the security credentials of the delivery entity (e.g., courier), such as a one (1) year clean background check devoid of any arrests or convictions. DelivSecurEquip 1260 indicates whether the delivery entity has any specialized security equipment (e.g., lockbox; firearm).

Column 1280 having all "●●●" designations is meant to be representative of the fact that the example types of data illustrated and described with respect to FIG. 12 are non-limiting and non-exhaustive, and a multitude of other types of delivery option data types may be included therein. Further, not all the types of data illustrated in FIG. 12 are necessarily required to be within a Delivery Option Database. Row 1205 contains the labels for the types of data, whereas rows 1215-1235 each contain data for a differing respective delivery entity (i.e., each candidate courier). Row 1245 having all "●●●" designations is meant to be representative of the fact that data for a multitude of additional delivery options may be included within the Delivery Option Database.

Discussion now turns to the prior example of the Atlanta-located customer requesting a replacement credit card, and how the data of the example FIGS. 9-12 databases might be used by the OL 205 in deciding a limited number of delivery options to offer to the customer, and later distribute instructions to a bank branch and/or delivery entity as to a customer-selected delivery option. More particularly, FIG. 13 illustrates an example flow which may be conducted by the orchestration layer (OL). After Start 1305, in analyzing the request geographically, the OL 205 might recognize (e.g., via parsing of the contents of the request packet (operation 1310)) that the GPS coordinates of the mobile device which issued the replacement credit card request, matches the GPS coordinates of Hotel STU located in the Atlanta, Ga. area. Responsive to such recognition, the OL 205 may limit (operation 1315) data consideration to Atlanta-based bank branches and Atlanta-based delivery entities, or to bank branches and delivery entities located within X miles of the GPS coordinates indicated within the request. The location of bank branches may be determined from the BranchGpsCoordin 1150 in the Branch Status Database 1100, and the location of delivery entities may be determined from the DelivGpsCoordin 1240 in the Delivery Option Database 1200.

Based on the above, the OL 205 may focus consideration to the bank branches of rows 1125-1145 of database 1100 having data (e.g., columns 1130-1140) indicating that the branch is located in Atlanta, Ga. The OL 205 may not consider bank branch B0 of row 1115 because that bank branch is located in the Washington, D.C. area (near the customer's home) as opposed to being located in Atlanta, Ga. (where the customer is currently located). Similar description may be made for bank branch B4 located in Monroe, Ga.

Next, based upon the recognition that the request is for a replacement credit card, the OL 205 might be configured to access (operation 1320) the row 1045, columns 1030-1070 data of the Delivery Rules Database 1000, to determine whether there are any security requirements required of the bank branch for preparation and delivery of a credit card. From row 1045, columns 1040-1050 of database 1000, the OL 205 determines that two (2) bankers, credit card equipment and a sealed envelope are all required at the bank branch for a bank branch to be eligible for preparation of the credit card.

In comparing such security requirements with the bank branch data of the Atlanta-based bank branches indicated in rows 1125-1145 of database 1100, the OL 205 may (operation 1325) eliminate bank branch B2 (row 1135) from eligibility given that branch B2 presently only has one (1) banker (see column 1170), and may eliminate any bank branch (row 1155) from eligibility which does not presently have credit card equipment (see row 1180).

Of the two (2) remaining eligible bank branches (i.e., branch B1 (row 1125) and branch B3 (row 1145)), OL 205 may be configured to select (operation 1330) the bank branch which is physically closest to the GPS coordinates indicated in the request. In the present example, the OL 205 determines (e.g., via comparisons of GPS coordinates) that bank branch B3 is closest to the customer. Therefore, the OL may select bank branch B3.

In further considering branch B3's row 1145, column 1170 data, the OL 205 determines (operation 1335) whether selected bank branch B3 has a runner personnel or not. If "Yes", an outside delivery entity is not needed, and the FIG. 13 flow ends (operation 1399). However, because column 1170 data reflects that B3 does not presently have a "runner" personnel who might make the delivery, an outside delivery entity is needed ("No" branch) to make the delivery from B3 to the customer's location.

In considering outside delivery entities, again responsive to previously-mentioned OL 205's determination that the GPS coordinates of the mobile device was located in the Atlanta, Ga. area, the OL 205 may limit consideration (operation 1350) to data of Atlanta-based delivery entities, or to delivery entities located within X miles of the GPS coordinates indicated within the request. The current location of delivery entities may be determined from the DelivGpsCoordin 1240 in the Delivery Option Database 1200. In this example, it is assumed that the OL 205 thereafter limits consideration to the delivery entities of rows 1215-1230 of database 1220 having data (columns 1220-1230) indicating that the delivery entity is located in Atlanta, Ga.

Next, in considering delivery entity security requirements (operation 1355), the OL 205 may determine based on row 1045, columns 1060-1070 of database 1000, that a delivery entity must have lockbox equipment and a five (5) year clean background record devoid of arrests or convictions, for the delivery entity to be eligible for picking up and delivering the credit card. In comparing the data of rows 1215-1235 data to such security requirements (operation 1360), the OL 205 may eliminate delivery entity D1 (row 1215) from eligibility at block 1360 given that D1 presently does not have the required lockbox (see column 1260), and may eliminate delivery entities D3 and D4 (rows 1230-1235) from eligibility given that entities D3 and D4 only have a three (3) year clean background record (see row 1250).

As a result of such operations, D2 is the only eligible delivery entity. Accordingly, upon the OL 205 determining (operation 1365) the lowest cost delivery entity of the eligible delivery entities, D2 would be determined the lowest considering that it is the only surviving delivery entity. Thus, D2 would be selected as the delivery entity by the OL 205.

At this point, the OL 205 has selected bank branch B3 and delivery entity D2, but the OL 205 must still decide (operation 1370) whether any costs of the delivery entity D2 should be charged to the requesting customer. The OL 205 might be configured to further analyze contents of the request packet 305A, to determine an identity of the customer. As mentioned previously, the request packet 305A may include information identifying the customer or the customer's mobile device. In this example, it is assumed that the OL 205 identifies the customer as "Jimmy Doe". At block 1370, the OL 205 searches the Customer Database 900 for Jimmy Doe. From row 935 of database 900, the OL 205 determines that customer Jimmy Doe has a present account balance of $750.00 (column 950).

The OL 205 may then access the Delivery Rules Database 1000 and use the determined $750.00 account balance to determine whether the delivery cost is chargeable to the customer or not. From row 1015, columns 1010-1020, the OL 205 determines that the "Actual Cost" is chargeable to a customer having an account balance which is $1000.00 or less. At block 1399, the flow ends.

Returning to FIG. 6, the OL 205 may utilize the determinations made (e.g., bank branch B3, delivery entity D2's $20.00 delivery cost, etc.) to prepare and present a limited number of delivery options back to the customer (at block 670). In this example, the OL 205 prepares display data which would result in FIG. 7's Select Delivery Options display (described previously) being displayed. The OL 205 is configured to then communicate with and provide the display data to the client mobile app 310 of the client's mobile device 134 through the communications channel 306A. The select delivery option data is then used to display selectable options on a display screen 140 of the client's mobile device 134.

Figure 14:
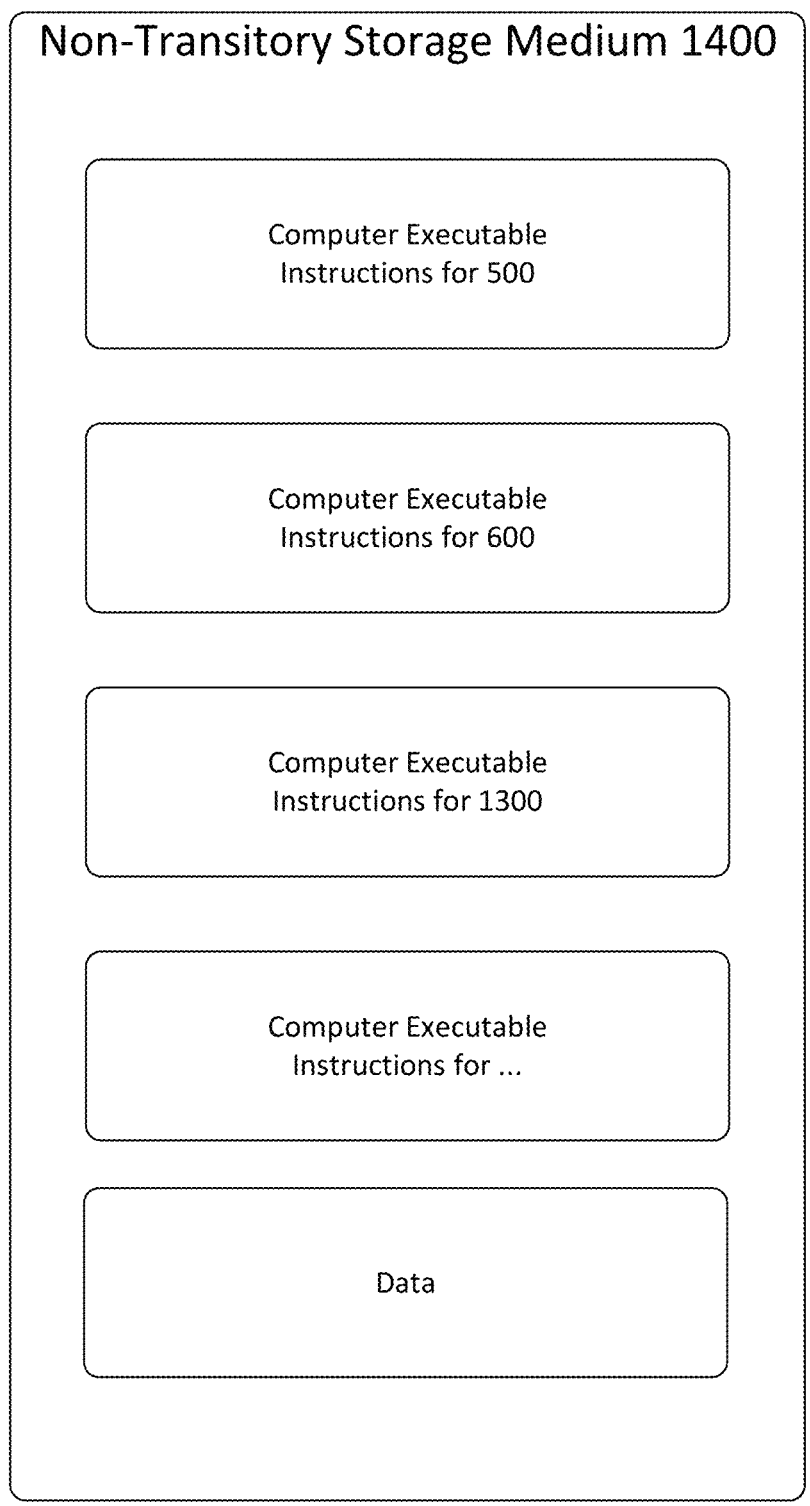
FIG. 14 illustrates an embodiment of a storage medium.

Next, FIG. 14 illustrates an embodiment of a storage medium 1400. Storage medium 1400 may include any non-transitory computer-readable storage medium or machine-readable storage medium, such as an optical, magnetic or semiconductor storage medium. In various embodiments, storage medium 1400 may include an article of manufacture. In some embodiments, storage medium 1400 may store computer-executable instructions, such as computer-executable instructions to implement one or more of logic flows or operations described herein, such as with respect to flow algorithms 500 of FIG. 5, 600 or FIGS. 6 and 1300 of FIG. 13. Storage medium 1400 may also store further computer-executable instructions, such as computer-executable instructions to implement other logic flows or operations, and may also store data. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. The embodiments are not limited in this context.

Figure 15:
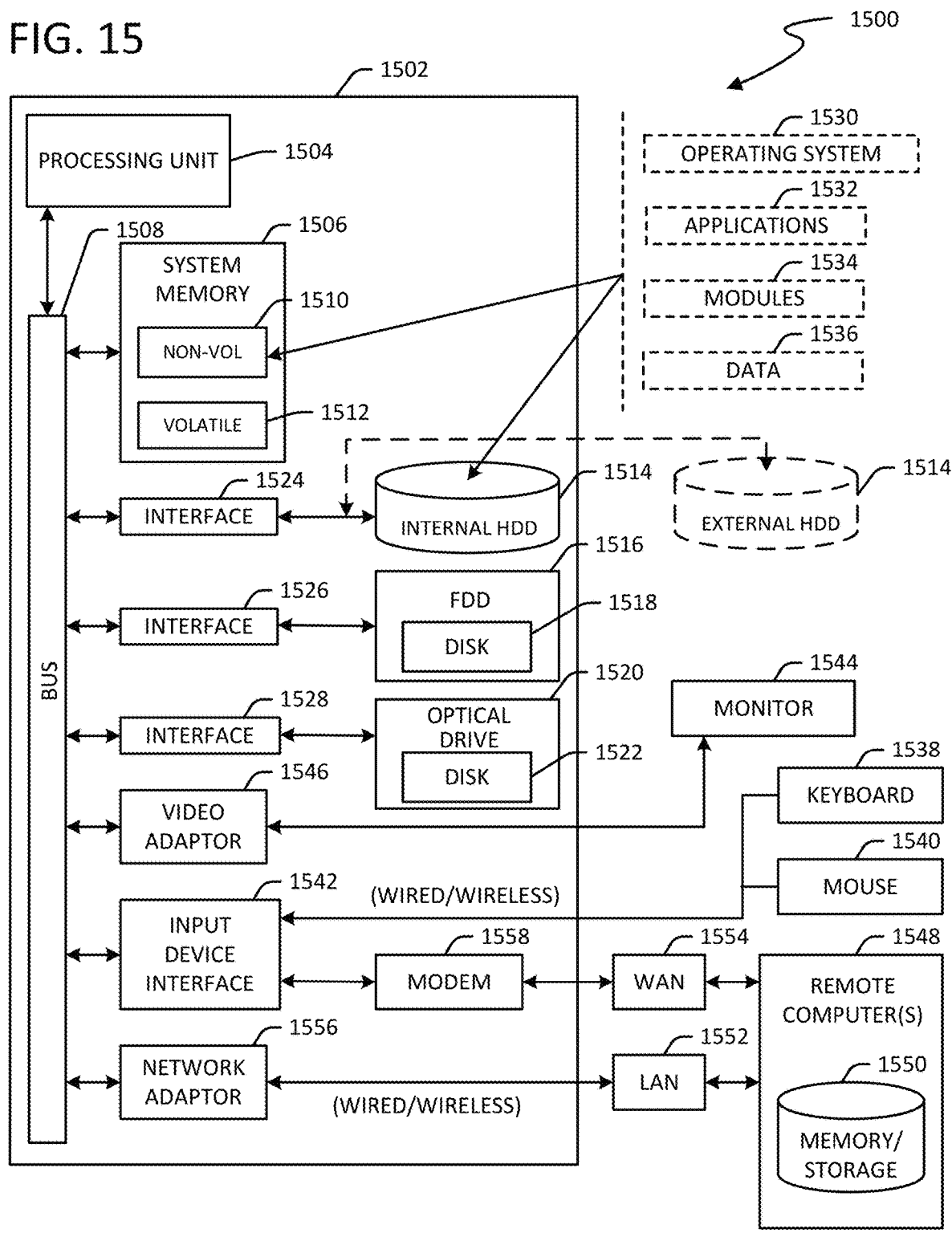
FIG. 15 illustrates an embodiment of a computing architecture such as a server.

FIG. 15 illustrates an embodiment of an exemplary computing architecture 1500 that may be suitable for implementing any of the components (e.g., computers, servers, client devices, etc.) of various embodiments as described anywhere within this disclosure. In various embodiments, the computing architecture 1500 may include or be implemented as part of an electronic device. In some embodiments, the computing architecture 1500 may be representative, for example, of a processor server that implements one or more components of the FIG. 3 arrangement, such as the above-discussed components. In some embodiments, computing architecture 1500 may be representative, for example, of a computing device that implements orchestration layer (OL) arrangements. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal.

Further embodiments, however, may alternatively employ data messages. Such data messages may be sent across various connections. Exemplary connections include parallel interfaces, serial interfaces, and bus interfaces.

The computing architecture 1500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1500.

As shown in FIG. 15, the computing architecture 1500 includes a processing unit 1504, a system memory 1506 and a system bus 1508. The processing unit 1504 can be any of various commercially available processors, including without limitation an AMD® Athlon®, Duron®, and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1504.

The system bus 1508 provides an interface for system components including, but not limited to, the system memory 1506 to the processing unit 1504. The system bus 1508 can be any of several types of bus structure that may further interconnect to a memory bus (with or without a memory controller), a peripheral bus, and a local bus using any of a variety of commercially available bus architectures. Interface adapters may connect to the system bus 1508 via a slot architecture. Example slot architectures may include without limitation, Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 15, the system memory 1506 can include non-volatile memory 1510 and/or volatile memory 1512. A basic input/output system (BIOS) can be stored in the non-volatile memory 1510.

The computer 1502 may include various types of computer-readable storage media in the form of one or more lower speed memory units, including an internal (or external) hard disk drive (HDD) 1514, a magnetic floppy disk drive (FDD) 1516 to read from or write to a removable magnetic disk 1518, and an optical disk drive 1520 to read from or write to a removable optical disk 1522 (e.g., a CD-ROM or DVD). The HDD 1514, FDD 1516 and optical disk drive 1520 can be connected to the system bus 1508 by a HDD interface 1524, an FDD interface 1526 and an optical drive interface 1528, respectively. The HDD interface 1524 for external drive implementations can include at least one or both of Universal Serial Bus (USB) and IEEE 1594 interface technologies.

The drives and associated computer-readable media provide volatile and/or nonvolatile storage of data, data structures, computer-executable instructions, and so forth. For example, a number of program modules can be stored in the drives and memory units 1510, 1512, including an operating system 1530, one or more application programs 1532, other program modules 1534, and program data 1536. In one embodiment, the one or more application programs 1532, other program modules 1534, and program data 1536 can include, for example, the various applications and/or components of the aforementioned servers of the present disclosure.

A user can enter commands and information into the computer 1502 through one or more wire/wireless input devices, for example, a keyboard 1538 and a pointing device, such as a mouse 1540. Other input devices may include microphones, infra-red (IR) remote controls, radiofrequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1504 through an input device interface 1542 that is coupled to the system bus 1508, but can be connected by other interfaces such as a parallel port, IEEE 994 serial port, a game port, a USB port, an IR interface, and so forth.

A monitor 1544 or other type of display device is also connected to the system bus 1508 via an interface, such as a video adaptor 1546. The monitor 1544 may be internal or external to the computer 1502. In addition to the monitor 1544, a computer typically includes other peripheral output devices, such as speakers, printers, and so forth.

The computer 1502 may operate in a networked environment using logical connections via wire and/or wireless communications to one or more remote computers, such as a remote computer 1548. The remote computer 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wire/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the LAN 1552 through a wire and/or wireless communication network interface or adaptor 1556. The adaptor 1556 can facilitate wire and/or wireless communications to the LAN 1552, which may also include a wireless access point disposed thereon for communicating with the wireless functionality of the adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wire and/or wireless device, connects to the system bus 1508 via the input device interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 16:
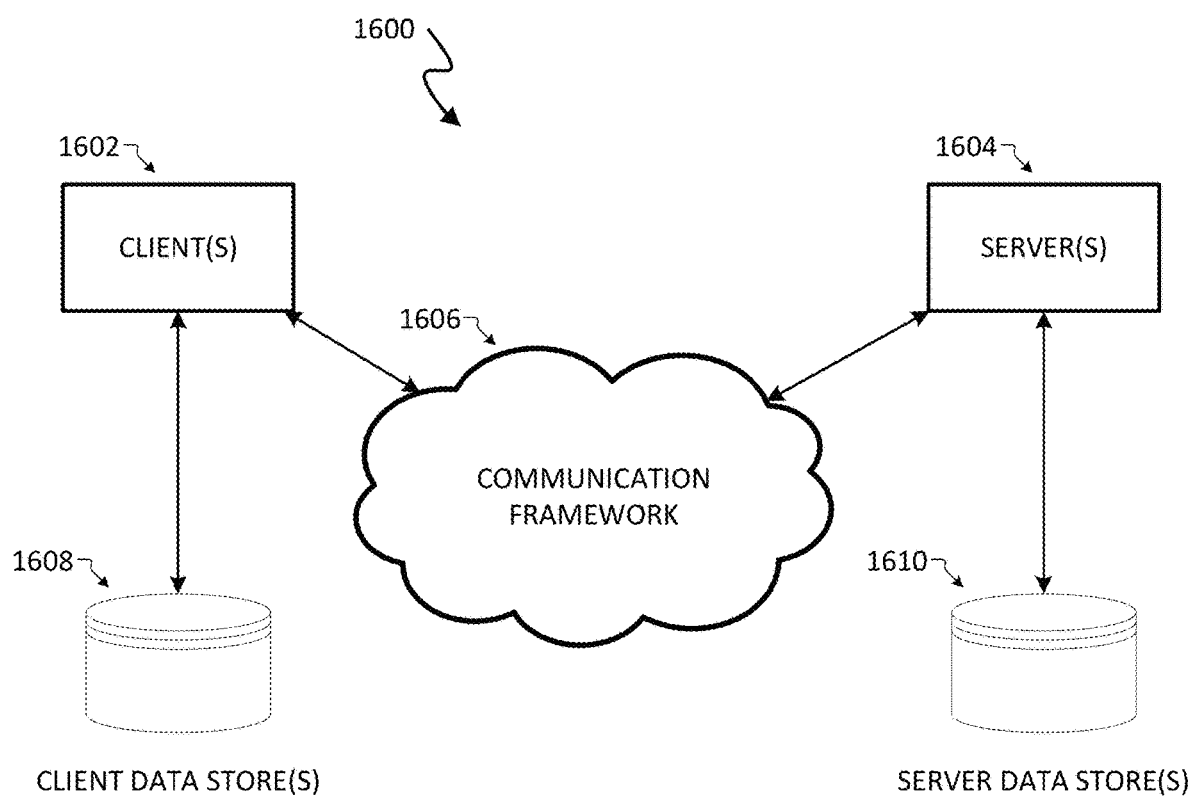
FIG. 16 illustrates an embodiment of a communications architecture.

FIG. 16 illustrates a block diagram of an exemplary communications architecture 1600 suitable for implementing various embodiments as previously described. The communications architecture 1600 includes various common communications elements, such as a transmitter, receiver, transceiver, radio, network interface, baseband processor, antenna, amplifiers, filters, power supplies, and so forth. The embodiments, however, are not limited to implementation by the communications architecture 1600.

As shown in FIG. 16, the communications architecture 1600 includes one or more clients 1602 and one or more servers 1604. The clients 1602 and the servers 1604 are operatively connected to one or more respective client data stores 1608 and server data stores 1610 that can be employed to store information local to the respective clients 1602 and servers 1604, such as cookies and/or associated contextual information. In various embodiments, any one of servers 1604 may implement one or more of logic flows or operations described herein, and storage medium in conjunction with storage of data received from any one of clients 1602 on any of server data stores 1610.

The clients 1602 and the servers 1604 may communicate information between each other using a communication framework 1606. The communications framework 1606 may implement any well-known communications techniques and protocols. The communications framework 1606 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1606 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1602 and the servers 1604. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Alternatively, the communication framework 1606 may be considered a "cloud". The term "cloud" is a shorthand reference to cloud computing infrastructure. The cloud includes one or more communication networks, such as the Internet, for example, and can further include portions of an industrial communications network, such as a local area network (LAN) or a wide area network (WAN). In cloud computing, a computing process may run on one or many connected cloud computers at the same time. In cloud computing, the cloud can host and run an application anywhere in the world. Further, the cloud enables access to the application from anywhere. Still further, the cloud may include a network or association of connected computer devices and digital electronic resources that can be used to perform processing and to relay communications.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

It should be appreciated that the example embodiments shown in the block diagram of several FIGS. may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments. Some examples may be described using the expression "in one example", "an example" or "in some embodiments" along with their derivatives. These terms mean that a particular feature, structure, or characteristic described in connection with the example is included in at least one example or embodiment. The appearances of the phrase "in one example" or "in some embodiments" in various places in the specification are not necessarily all referring to the same example or embodiment.

In the context of the present disclosure, unless expressly provided otherwise, numerical words like "first", "second", "third", etc. have been used as adjectives only for the purpose of allowing for distinction between the nouns that they modify from one another, and not for the purpose of describing any particular relationship between those nouns.

As may or may not have been mentioned previously, various features, operations, etc. of this disclosure may be practiced "simultaneously", "concurrently" or "parallelly". As used within a content of this disclosure, the term 'simultaneous' means that two things (e.g., collecting; analyzing, etc., of differing information) happen at the same time (i.e., at least partially occur or overlap in time), while the term 'concurrent' means that the two things may occur during the same period of time, but do not necessarily happen at the same time. Concurrent is the broader term, and may include instances of things occurring simultaneously. If two things (e.g., collecting; analyzing, etc., of differing information) overlap in time partially but not completely, the things may be described as occurring concurrently, while the overlapping portion may be described as occurring simultaneously. Further, the term "parallel" means that two things occur along two differing paths or via differing operations. Parallel may include instances which occur simultaneously, instances which occur concurrently, and/or instances occurring at wholly differing time periods.

In this disclosure, the term "real time" refers to a time scale that is substantially simultaneous to an item or instance which provoked a subsequent action. In contrast, the term "near real time" refers to a time scale that is slower than the time scale referred to as "real time," for example by about one or more orders of magnitude, or by requiring a finite amount of time (e.g., milliseconds) rather than being substantially simultaneous.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

The invention claimed is:

1. A delivery orchestration method, comprising:
   determining, by a computer processor based on a financial institutional database comprising customer data, rules data, and security requirements data, customer eligibility for delivery of a payment card to a customer and from a financial institution, the security requirements data comprising a required mode of delivery for the payment card and a required packaging for the payment card;
   responsive to a request for the payment card, determining, by the processor based on a rate of updates to a branch status database and a rate of updates to a delivery option database, to invoke updating of data in the branch status database and data in the delivery option database, respectively;
   receiving real-time delivery option data by the processor from the branch status database and the delivery option database, the branch status database including data for offices of the financial institution and the delivery option database including data for external vendors, where the delivery option data is related to a plurality of real-time delivery options which are combinable to devise a plurality of delivery plans, wherein the real-time delivery option data received from the delivery option database comprises a real-time pick-up time availability of the external vendors;
   analyzing, by the processor, the customer data, the rules data, and the delivery option data;
   generating, by the processor based on the analyzing, one or more delivery plans satisfying the rules data and the security requirements data;
   altering a cost of at least one of the one or more delivery plans based on an amount of time the customer has held one or more accounts with the financial institution and an amount of assets held in the one or more accounts of the customer within the financial institution;
   transmitting, by the processor via a network connection to an electronic device, the one or more delivery plans to the customer;
   receiving, by the processor, selection of one of the delivery plans from the electronic device via the network connection; and
   causing, by the processor, impression machinery to impress a payment card blank to generate the payment card for delivery according to the selected one of the delivery plans.

2. The delivery orchestration method of claim 1, wherein the cost is further altered based on a number of transactions conducted by the customer within a predetermined period of time, wherein the real-time delivery option data is received responsive to polling instructions sent to the branch status database and the delivery option database.

3. The delivery orchestration method of claim 1, wherein the real-time delivery option data for each office of the offices received from the updated branch status database comprises: a real-time availability of the payment card from the office; a real-time availability of payment card blanks at each office; a real-time availability of personnel within the office who meet the requirements specified by the security requirements data to perform tasks needed for the delivery; whether the office is presently operational; whether components, equipment or software needed to prepare for the delivery is presently operational within the office; and business hours that the office is scheduled to be open.

4. The delivery orchestration method of claim 1, wherein the real-time delivery option data for each external vendor of the external vendors received from the delivery option database comprises: a real-time delivery time availability of the external vendor; a real-time availability of vendor personnel who meet the requirements specified by the security requirements data for the delivery; a real-time availability of vehicles meeting the mode of delivery; a real-time availability of equipment to provide the required packaging; a historical reliability value attributed to the external vendor; a historical reliability value attributed to vendor personnel; and a cost of the delivery provided via the external vendor.

5. The delivery orchestration method of claim 1, further comprising:
   communicating at least a first portion of the delivery plan selected by the customer, to at least one office of the financial institution including the impression machinery which is to generate the payment card using the payment card blank; and
   communicating at least a second portion of the delivery plan selected by the customer to an external vendor for the delivery of the payment card to the customer, and to the at least one office of the financial institution.

6. The delivery orchestration method of claim 5, further comprising:
   the external vendor for the delivery acquiring the payment card from the at least one office of the financial institution responsive to receipt of the second portion of the delivery plan, and delivering the payment card to the customer.

7. The delivery orchestration method of claim 1, wherein the delivery orchestration method being implemented by an orchestration layer on a server, wherein the orchestration layer invokes the updates to the branch status database and the delivery option database, wherein the one or more delivery plans are further generated based on a respective distance from each office to the electronic device, wherein the distances are based at least in part on global positioning system (GPS) coordinates of each office and the electronic device.

8. A non-transitory computer-readable medium storing instructions which when executed by a processor cause the processor to:
   access a financial institutional database including customer data, rules data and security requirements data, to determine customer eligibility for delivery of a payment card to a customer from a financial institution, the security requirements data comprising a required mode of delivery for the payment card and a required packaging for the payment card;

responsive to a request for the payment card, determine, based on a rate of updates to a branch status database and a rate of updates to a delivery option database, to invoke updating of data in the branch status database and data in the delivery option database, respectively;

receive real-time delivery option data from the branch status database and the delivery option database, the branch status database including data for offices of the financial institution and the delivery option database including data for external vendors, where the delivery option data is related to a plurality of real-time delivery options which are combinable to devise a plurality of delivery plans, wherein the real-time delivery option data received from the delivery option database comprises a real-time pick-up time availability of the external vendors;

analyze the customer data, the rules data, and the delivery option data;

generate, based on the analysis, one or more delivery plans satisfying the rules data and the security requirements data;

alter a cost of at least one of the one or more delivery plans based on an amount of time the customer has held one or more accounts with the financial institution and an amount of assets held in the one or more accounts of the customer within the financial institution;

transmit, via a network connection to an electronic device, the one or more delivery plans to the customer;

receive selection of one of the delivery plans from the electronic device via the network connection; and cause impression machinery to impress a payment card blank to generate the payment card for delivery according to the selected one of the delivery plans.

9. The medium of claim 8, wherein the cost is further altered based on a number of transactions conducted by the customer within a predetermined period of time, wherein the real-time delivery option data is received responsive to polling instructions sent to the branch status database and the delivery option database.

10. The medium of claim 8, wherein the real-time delivery option data for each office of the offices received from the updated branch status database comprises: a real-time availability of the payment card from the office; a real-time availability of payment card blanks at each office; a real-time availability of personnel within the office who meet the requirements specified by the security requirements data to perform tasks needed for the delivery; whether the office is presently operational; whether components, equipment or software needed to prepare for the delivery is presently operational within the office; and business hours that the office is scheduled to be open.

11. The medium of claim 8, wherein the real-time delivery option data for each external vendor of the external vendors received from the delivery option database comprises: a real-time delivery time availability of the external vendor; a real-time availability of vendor personnel who meet the requirements specified by the security requirements data for the delivery; a real-time availability of vehicles meeting the mode of delivery; a real-time availability of equipment to provide the required packaging; a historical reliability value attributed to the external vendor; a historical reliability value attributed to vendor personnel; and a cost of the delivery provided via the external vendor.

12. The medium of claim 8, storing instructions which when executed by the processor cause the processor to:

communicate at least a first portion of the delivery plan selected by the customer, to at least one office of the financial institution including the impression machinery which is to generate the payment card using the payment card blank; and communicate at least a second portion of the delivery plan selected by the customer to an external vendor for the delivery of the payment card to the customer, and to the at least one office of the financial institution.

13. The medium of claim 8, wherein instructions are implemented as an orchestration layer on a server, wherein the orchestration layer invokes the updates to the branch status database and the delivery option database, wherein the one or more delivery plans are further generated based on a respective distance from each office to the electronic device, wherein the distances are based at least in part on global positioning system (GPS) coordinates of each office and the electronic device.

14. A system, comprising:

a processor; and a memory storing instructions which when executed by the processor cause the processor to:

access a financial institutional database including customer data, rules data and security requirements data, to determine customer eligibility for delivery of a payment card to a customer from a financial institution, the security requirements data comprising a required mode of delivery for the payment card and a required packaging for the payment card;

responsive to a request for the payment card, determine, based on a rate of updates to a branch status database and a rate of updates to a delivery option database, to invoke updating of data in the branch status database and data in the delivery option database, respectively;

receive real-time delivery option data from the branch status database and the delivery option database, the branch status database including data for offices of the financial institution and the delivery option database including data for external vendors, where the delivery option data is related to a plurality of real-time delivery options which are combinable to devise a plurality of delivery plans, wherein the real-time delivery option data received from the delivery option database comprises a real-time pick-up time availability of the external vendors;

analyze the customer data, the rules data, and the delivery option data;

generate, based on the analysis, one or more delivery plans satisfying the rules data and the security requirements data;

alter a cost of at least one of the one or more delivery plans based on an amount of time the customer has held one or more accounts with the financial institution and an amount of assets held in the one or more accounts of the customer within the financial institution;

transmit, via a network connection to an electronic device, the one or more delivery plans to the customer;

receive selection of one of the delivery plans from the electronic device via the network connection; and cause impression machinery to impress a payment card blank to generate the payment card for delivery according to the selected one of the delivery plans.

15. The system of claim 14, wherein the cost is further altered based on a number of transactions conducted by the customer within a predetermined period of time, wherein the real-time delivery option data is received responsive to polling instructions sent to the branch status database and the delivery option database.

16. The system of claim 14, wherein the real-time delivery option data for each office of the offices received from the updated branch status database comprises: a real-time availability of the payment card from the office; a real-time availability of payment card blanks at each office; a real-time availability of personnel within the office who meet the requirements specified by the security requirements data to perform tasks needed for the delivery; whether the office is presently operational; whether components, equipment or software needed to prepare for the delivery is presently operational within the office; and business hours that the office is scheduled to be open.

17. The system of claim 14, wherein the real-time delivery option data for each external vendor of the external vendors received from the delivery option database comprises: a real-time delivery time availability of the external vendor; a real-time availability of vendor personnel who meet the requirements specified by the security requirements data for the delivery; a real-time availability of vehicles meeting the mode of delivery; a real-time availability of equipment to provide the required packaging; a historical reliability value attributed to the external vendor; a historical reliability value attributed to vendor personnel; and a cost of the delivery provided via the external vendor.

18. The system of claim 14, wherein the instructions further cause the processor to:
communicate at least a first portion of the delivery plan selected by the customer, to at least one office of the financial institution including the impression machinery which is to generate the payment card using the payment card blank; and
communicate at least a second portion of the delivery plan selected by the customer to an external vendor for the delivery of the payment card to the customer, and to the at least one office of the financial institution.

19. The system of claim 14, wherein the instructions are implemented on an orchestration layer of a server, wherein the orchestration layer invokes the updates to the branch status database and the delivery option database, wherein the one or more delivery plans are further generated based on a respective distance from each office to the electronic device, wherein the distances are based at least in part on global positioning system (GPS) coordinates of each office and the electronic device.

* * * * *